US012105755B1

(12) United States Patent
Omar et al.

(10) Patent No.: US 12,105,755 B1
(45) Date of Patent: Oct. 1, 2024

(54) AUTOMATED CONTENT FILTERING USING IMAGE RETRIEVAL MODELS

(71) Applicant: Amazon Technologies, Inc., Seattle, WA (US)

(72) Inventors: Mohamed Kamal Omar, Seattle, WA (US); Xiaohang Sun, Bellevue, WA (US); Han-Kai Hsu, Seattle, WA (US); Ashutosh Sanan, Seattle, WA (US); Wentao Zhu, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 73 days.

(21) Appl. No.: 17/852,063

(22) Filed: Jun. 28, 2022

(51) Int. Cl.
*G06F 16/71* (2019.01)
*G06N 20/00* (2019.01)

(52) U.S. Cl.
CPC ............. *G06F 16/71* (2019.01); *G06N 20/00* (2019.01)

(58) Field of Classification Search
None
See application file for complete search history.

(56) References Cited

U.S. PATENT DOCUMENTS

| 10,311,913 | B1 * | 6/2019 | Shekhar | G06V 20/41 |
| 11,310,539 | B1 * | 4/2022 | Yun | G06V 20/48 |
| 2007/0255755 | A1 * | 11/2007 | Zhang | G06F 16/78 |
| 2010/0191722 | A1 * | 7/2010 | Boiman | G06F 16/739 |
| | | | | 707/723 |
| 2012/0321181 | A1 * | 12/2012 | Yang | G06F 16/783 |
| | | | | 382/209 |
| 2013/0142418 | A1 * | 6/2013 | van Zwol | G06V 20/47 |
| | | | | 382/159 |
| 2018/0349391 | A1 * | 12/2018 | Chechik | G06F 16/743 |
| 2020/0112771 | A1 * | 4/2020 | Kim | H04N 21/42203 |
| 2020/0349355 | A1 * | 11/2020 | Huh | H04N 21/8549 |
| 2021/0004589 | A1 * | 1/2021 | Turkelson | G06V 30/19173 |
| 2021/0110371 | A1 * | 4/2021 | Garner | G06V 10/776 |
| 2022/0300802 | A1 * | 9/2022 | Torres | G06N 3/045 |
| 2022/0358314 | A1 * | 11/2022 | Shen | G06N 20/00 |
| 2022/0383190 | A1 * | 12/2022 | He | G06N 3/045 |
| 2023/0029278 | A1 * | 1/2023 | Parush Tzur | G06F 16/7328 |
| 2023/0298571 | A1 * | 9/2023 | Stewart | G10L 15/22 |
| | | | | 704/235 |

FOREIGN PATENT DOCUMENTS

| CN | 109960745 B | * | 3/2021 | |
| CN | 113051434 A | * | 6/2021 | |
| CN | 113095239 A | * | 7/2021 | |
| CN | 113761253 A | * | 12/2021 | |
| CN | 114564616 A | * | 5/2022 | |
| CN | 116561371 A | * | 8/2023 | |
| CN | 112866801 B | * | 10/2023 | ........... H04N 17/004 |

* cited by examiner

*Primary Examiner* — Augustine K. Obisesan
(74) *Attorney, Agent, or Firm* — Lee & Hayes, P.C.

(57) ABSTRACT

Systems and techniques for retrieving video data associated with a selected attribute are described. The systems and techniques include receiving a multimodal input associated with the attribute for querying a catalog of video data to identify video data including the attribute. A first embedding is determined for the input using a first encoder to map the input to a representation space. A second embedding is determined for the video data to map the video data to the representation space. A similarity score is determined between the video data and the input based on a distance between the embeddings. The video data associated with the attribute may be selected based on the similarity score.

20 Claims, 16 Drawing Sheets

AUTOMATED CONTENT FILTERING USING IMAGE RETRIEVAL MODELS

BACKGROUND

Video content is readily available through a number of platforms, with ever increasing volumes of video content produced daily. The video content includes wide ranges of content and comes from a variety of sources. It has become apparent that facilitating retrieval and identification of video content according to particular content is valuable to video content producers as well as consumers. Typical keyword-based searching for video content relies on accurate and complete labeling or annotation of video content, which is increasingly more difficult due to the continual increase in video content produced. Accordingly, the video content may not be consistently annotated or labeled or annotated at all based on the content of the videos. The current method of collecting scene-level-data for understanding content requires operators to watch the entirety of a title and manually apply labels based on the observed content. Such manual processes have proven cumbersome, particularly as authors and content providers amass a large volume of content items. Moreover, relying solely on an author or content provider to generate labels manually risks excluding many relevant labels that may reduce the "findability" of content. In addition to findability, content labeling of video data is used for compliance, recommendation systems, contextual advertising, and other such systems. Accordingly, acquiring accurate and more complete labelling of video content increases the abilities of other systems that rely on such labels.

BRIEF DESCRIPTION OF THE DRAWINGS

The detailed description is described with reference to the accompanying drawings. In the figures, the left-most digit(s) of a reference number identifies the figure in which the reference number first appears. The use of the same reference numbers in different figures indicates similar or identical components or features.

DETAILED DESCRIPTION

Figure 1:
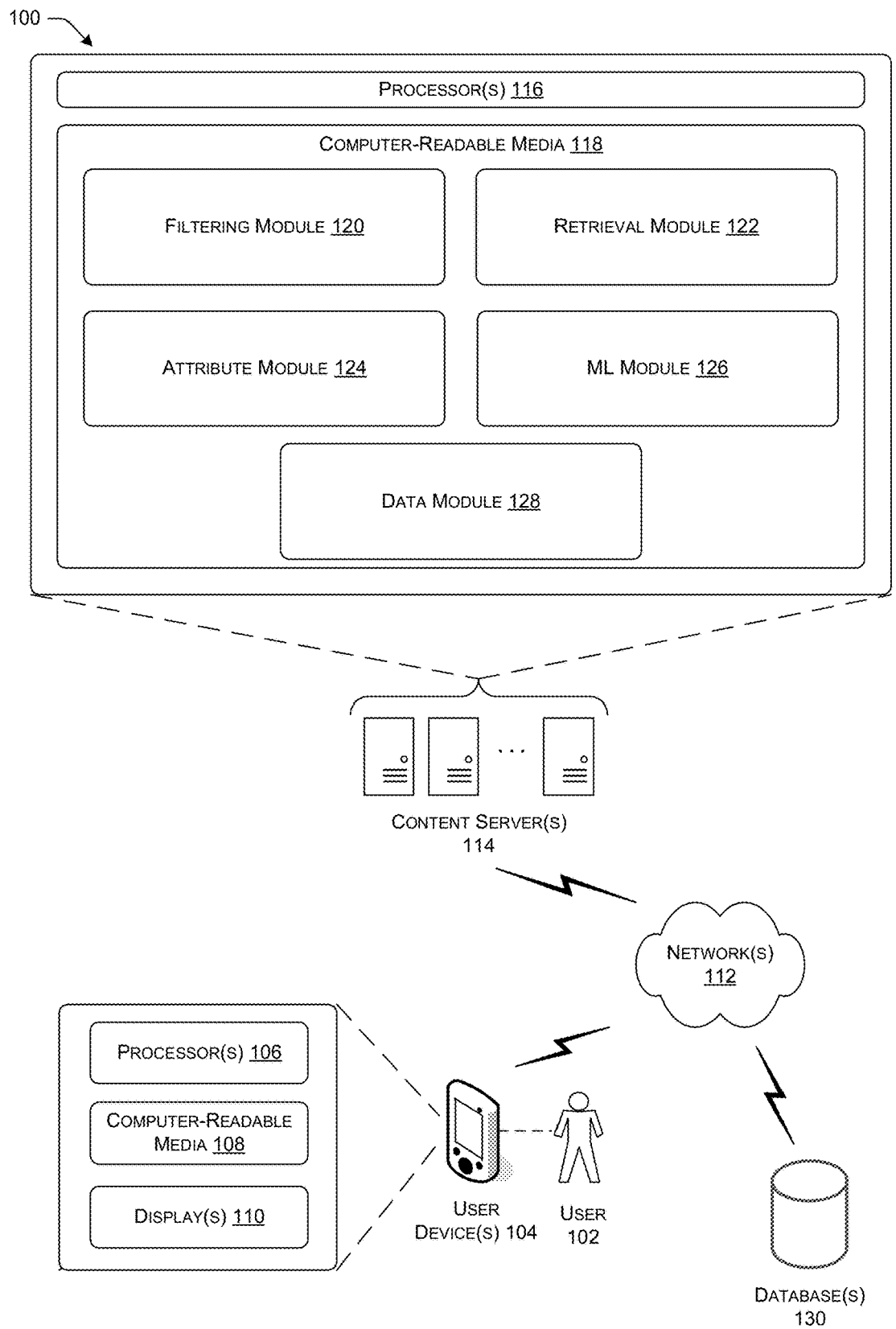
FIG. 1 illustrates an example system for multimodal video content classification, filtering, and retrieval, according to at least some examples.

Described herein are, among other things, techniques and systems for understanding video content by identifying video content associated with particular content (e.g., scenes, objects, situations, locations, etc.) and automating video content retrieval, filtering, and classification. On a video hosting platform, having an understanding of the content of each video product enables the platform to inform customers on what to expect (e.g. violence, tobacco use, alcohol, etc.). With such knowledge available, customers can easily identify or stay away from content they are not interested in without watching it. Further, the techniques described herein enable identification of video content that has violated specific platform policies, such as copyright policies or content-specific policies. Further still, the platform is enabled to make content-based video recommendations to target customer groups and/or particular customers based on their preferences and/or interests. To accomplish these goals, the techniques and systems described herein provide a video retrieval system that perceives a video using different senses like humans would, e.g., audio, video, and text. The techniques use the various modalities (e.g., audio, video, and text) to enable video clip retrieval. This enables the platform to search for any video content of interest or detect any red flags within a video in terms of copyright infringement or policy violation.

As opposed to typical video content interpretation, that is performed at a title level, e.g., a movie may be broadly labeled with particular content labels that apply across the title, the techniques described herein enable the interpretation of video content at the scene level. Accordingly, recommendations, ratings, warnings, and other applications can be built around specific actions, objects, or contexts of individual scenes. For example, if a consumer has an affinity for movies with car chases, the platform may use the techniques described herein to identify video content (an entirety of the video content or just a relevant scene) including car chases and recommend such content to the consumer. Additionally, the platform may identify scenes with subjects that may be illegal, culturally sensitive, or inappropriate for one or more territories where the platform operates. There may be hundreds or thousands of such scene-level contexts throughout the world to consider just for compliance, let alone other purposes. Gathering this scene-level data is a time-consuming process that requires teams to watch the entirety of a title or spend months automating the identification of a single scene context, such as nudity. Accordingly, to enable such platform compliance and context identification, the platform may need to increase manpower to unreasonable or impracticable levels to keep pace with the production of video content worldwide. Accordingly, the techniques described herein also provide for machine learning solutions to enable the benefits described herein while also reducing machine learning model development time, allowing for the rapid creation of AI-powered experiences.

The techniques described herein expedites scene-level data collection for video content through a self-contained service that enables anyone to create a machine learning model to detect a specific object, context, or action within video data using text, audio, or video input data. The platform uses a search that may scan a database storing video data and identify matching scenes, objects, or contexts to the desired set of images, video, audio, or captions (e.g., text). These matching scenes can then be labeled as "correct" or "incorrect" for the desired use-case. When the matches produced by the model reach a predetermine level of accuracy, the platform may then select and train a machine learning model for the context. This streamlined process enables non-data scientists to create their own machine learning models. In some examples, the results of the context labeling may be published in the database storing the video content as a "tag" for each scene, labeling the timestamp and the confidence of the prediction. Accordingly, as additional machine learning models are developed and run on the database of video data, the database may become a unified content database with context tags for deep understanding of each video title stored in the database.

To accomplish the benefits described above, the systems and techniques described herein provide for filtering, retrieving, and classifying video content with content tags through the use of machine learning models. The video data may then be used as training data for training machine learning models, for example to classify content within the video catalog. Initially, the techniques described below relate to retrieval of video content attributes, that is to say identification and retrieval of video content from a video database as similar to input data, such as text data describing a particular context. Additional input data such as video, audio, or other modalities may also be used to define the attributes. After the input data is provided to a machine learning model, the machine learning model will retrieve video data having similarity scores at or above a threshold with respect to the attribute described by the input.

To accomplish retrieval of video content attributes, e.g., tags, the systems and techniques described herein provide a machine learning model that learns a similarity between a text description and a particular video clip. The machine learning model may include two single-modal encoders that individually map the text data and the video data into the same representation space where the similarity can be observed based on the distance between two vectors, e.g., between the embeddings from the encoders of the text and video data. In doing so, the technique involves extracting text embeddings using a first encoder and extracting video embeddings based on frame embeddings for a video clip sampled at a particular rate, such as 1 frame per second. After the embeddings are generated by the encoders, a transformer-based header aggregates the representation of both the text embedding and the video embedding and outputs a similarity score. During inference, the machine learning model may generate similarity scores that correlate an input text with a video clip.

In more particular detail, the video data and text data may be encoded with video and text encoders, respectively, and subsequently determine a similarity between the video data and text data using a similarity score determination. For the video embedding generation, in some examples, frame embeddings may be determined for representative frames of the video data, with the frame embeddings subsequently aggregated into video embedding using a temporal transformer and frame position embedding. In some examples, the text embedding generation may be performed using a bidirectional encoder representations from transformers (BERT) to initially generate token embeddings and subsequently project the token embeddings into the same representation space as the video embedding. In some examples, similar to a text-to-image retrieval machine learning model, contrastive learning may be used to refine the machine learning model used to determine the similarity between the input data and the video data.

In some instances, audio description, such as a voiceover narration of video data, may be associated with the video data. Such audio descriptions may describe what is happening in the video data during the natural pauses in the audio, and sometimes during dialogue if deemed necessary. The audio descriptions may be used for performing similarity determinations, for example by determining a similarity between the audio description and the input data as described above, that is, generating embeddings in one or more different modalities (e.g., text, audio, video) and determining a distance in a shared representation space for the different embeddings.

In some examples, the attribute retrieval process may use an image search model to retrieve video data associated with particular attributes. For instance, in a particular video clip, a representative frame, such as a middle frame, first frame, last frame, or other frame, may be extracted and used to represent a video clip having a short duration (e.g., having a length of about five seconds or less). After representative frames are extracted from the video data, a similarity between input data and each of the representative frames may be used to represent a similarity between the input data and the video clip. In such examples a machine learning model, such as the OpenAI CLIP model, may be used to determine a text embedding for a text input and the same machine learning model, or in some examples a different model, may be used to determine image embeddings for the representative frames. A video embedding may be calculated from the frame embeddings by mean pooling, or other known aggregation techniques.

While abundant video data may be beneficial for development and training of machine learning models, for example for developing models to identify attributes as described herein, training data may be difficult and/or time consuming to identify from such large quantities of video data. For example, to build a video classification model that can detect gun shooting, model developers may collect video samples that contain gun shooting events for training, validation, and testing from the video catalog. However, gun shooting events or other such events may be rare in a video catalog, therefore it may be difficult to find such examples by randomly sampling the video titles or even using keyword-based searching of metadata (such as synopsis, genre, title, etc.). Low volume of training data usually results in low machine learning model performance. And further, though some machine learning training techniques require little to even no training data, evaluation samples may still be required to validate the performance of the machine learning model. The techniques described herein further provide for filtering large-scale video catalogs with a classification model and a content-based image retrieval (CBIR) model, or media retrieval model that may be capable of retrieving video or other multimodal data, to increase the efficiency of data collection and lower the burden of manual annotation and thereby improve the machine learning model performance and production time. The video data filtering may combine data collection processes with image classification and action classification models to aid in filtering video catalogs for particular attributes.

The filtering process may begin by initially segmenting the videos into video clips, which may be performed by a video shot boundary detection algorithm that implements color histograms differences to differentiate abrupt shot boundaries in video data from smooth shot boundaries and thereby identify natural breaks in the video data. After segmenting the video data, a representative frame, such as a middle frame of each video clip may be selected. The representative frames may be indexed by (i) an image classification model that maps images to labels (e.g., a classification model that is trained to recognize various classes of images or objects within images, and (ii) a media retrieval model encoder that maps images to fixed length embeddings in a representation space with embeddings of source images compared in the representation space based on the distance between the embeddings to determine similarity.

In some examples, the filtering process may include two stages: (1) retrieving and (2) selection. During the retrieving stage, both the classification model and the media retrieval model are used to filter the video catalog. For the classification model, one or more labels related to particular content of interest (e.g., knife, gun, explosion for violent content) are selected and video shots (e.g., representative frames) that are related (or are predicted to be associated with the one or more labels) with the content of interest are retrieved. The retrieved clips may then be sorted based on the predicted score assigned by the classification model in descending order, and a subset of the retrieved clips may be selected for continuing. The subset may be selected based on a predetermined threshold of predicted score, a predetermined number of retrieved clips, or other such criteria.

For the media retrieval model, initially, one or more query words and/or images that are considered related with the content of interest may be input into the media retrieval model and the encoder of the media retrieval model may generate one or more embeddings for the input queries. After the embeddings are generated, similarity scores between the embeddings of the queries and the embeddings of the representative frames may be calculated to identify similar content. In some examples, the similarity scores may be calculated by computing the inner product or cosine similarity between the embeddings. The video clips retrieved by the media retrieval model are then sorted in descending order and a subset of the video clips are retained as described above for next steps.

During a selection stage, a selection of video shots is selected from the subsets retrieved by the classification model and the media retrieval model for validation. The selection may be random or may be according to some predetermined technique. The selected video shots may then be validated to compare the accuracy of the retrieval by the classification model and the media retrieval model. In some examples, the validation may include a manual validation of a handful of results, such as ten or fewer video shots per subset. The results having a higher accuracy score may then be stored as a training dataset for a machine learning model to identify the particular attribute or content identified by the input. Additionally, the media retrieval model and/or the classification model may be refined through iterative training based on the accuracy scores determined by the validation. For instance, the media retrieval model and/or the classification model may be trained using the results of the more accurate of the two models, or in some examples, the models may be further trained through contrastive learning with the selected video clips labeled as positive instances or negative instances based on the validation.

In some examples, the classification model may include an image classification model such as Rekognition®, by Amazon. Rekognition®, and possibly other classification models/services, may be capable of detecting 2474 pre-defined object categories such as vehicle, table, bag, etc. When the videos of interest do not fall in one or more of these pre-defined categories, the retrieval and selection method mentioned above may be performed as described. However, when the videos of interest are not related with any of the 2474 categories, in some examples only the media retrieval model may be used to determine the training dataset.

In some examples, the media retrieval model may include a media retrieval encoder and a similarity calculator. The media retrieval encoder calculates embeddings from representative frames and queries by fusing the OpenAI CLIP image encoder and the ResNet-50 encoder with multi-head attention. The similarity calculator may determine a cosine similarity or inner product between the embeddings output by the encoder. The media retrieval model can receive inputs of words, images, videos, or both words and images or videos as query input, and output a subset of video clips as the most related video shots.

The techniques described herein also enable the generation of a repository of scene or frame-level attributes for video content to provide deep understanding of the content within the videos that may be used for various downstream processes described above, including compliance, recommendations, product placement, and other such purposes. The techniques described herein expedite attribute identification for frames and scenes by automatically identifying actions, objects, contexts, and other data about video within a video catalog. The attribute classification may be performed by one or more machine learning models that can cover a scalable number of attributes that may continue to grow as additional models and/or attributes are identified with models trained to identify such attributes in the video catalog. The collection of attributes across an entire catalog may be continually added to and continue to provide further context and content labels for an ever-increasing amount of video content. The techniques described herein provide for using one or more pretrained backbones for machine learning models combined with a classification layer. In some examples, the pretrained backbones may remain unchanged as additional models are developed and trained, and only the classification layer may be trained or altered to classify the particular selected attribute. In some examples, the backbone may include ImageNet, or some other similar model such as a convolutional neural network (CNN).

As described above, the pretrained backbone for the machine learning models used to identify different attributes may be re-used across multiple different attributes or types of content to enable building a scalable system for continually updating attribute classification of a video catalog. In some examples, a fully supervised model (e.g., a CNN or other such supervised model) may be used for determining embeddings.

In some examples, a semi-supervised approach for a machine learning model may be used to learn from a large quantity of unlabeled data within the video catalog and learn to produce embeddings that may be implemented across other use cases. For instance, a semi-supervised approach may include a teacher-student training framework in which a fully supervised trained teacher model is used to pseudo-label the unlabeled data in order to train the student model on the output of the fully supervised trained teacher model.

In some examples, the techniques described herein provide for machine learning models that may receive inputs of multiple different modalities to automate content understanding, search multimedia, and provide an automated utility to build and train new models through a simple user interface to reduce burden and effort to build models for multimedia content understanding across a catalog of multimedia such as videos. As described above, a classification system may receive different modalities and output attributes for video content, for example to create a set of attributes associated with a particular video file that provide a deeper understanding of the video content without watching the entire video content or relying on a high-level label or annotation that may not provide sufficient detail. The system also enables searching of the video catalog for new attributes and training new machine learning models to identify the new attribute, and afterwards updating the attributes associated with the videos within the catalog to further improve the understanding of the video content.

A typical method of collecting scene-level-data requires operators to watch the entirety of a title and summarize the entirety of the title with annotations or apply particular annotations to an entire title though they may only apply to a single scene within the video title. The techniques described herein provide automation to this process as a user will be able to search the video catalog for data by just giving image and/or video of the attribute and/or textual keywords related to it.

In addition to the above, the techniques described herein provide for a process to train and add new models to identify additional attributes to currently existing models. To use this service a user can use an image, text, and/or video search to curate new data related to their new attributes. The system may then provide an intuitive interface in which the user can select a type of model and details about the model before training. In some examples, the system may recommend a model type based on the inputs provided by the user. The user may then select data for training the model using clusters of data to quickly define training datasets that may be used to train a new model with click of a button.

Turning now to the figures, FIG. 1 illustrates an example system 100 for multimodal video content classification, filtering, and retrieval, according to at least some examples. More particularly, the example system 100 may be used to filter video data, retrieve similar video content based on particular attributes associated with video content, and determine attributes for video content. Though FIG. 1 is shown having particular modules and elements, other modules, components, or elements may be used to accomplish the techniques associated therewith. The elements of the example system 100 illustrate an example environment for performing various multimodal video content attribute techniques as described herein.

As shown in FIG. 1, the example system 100 may include one or more users 102, one or more user devices 104 associated with the users 102, one or more network(s) 112, a database 130 having attribute data, image data, audio data, and/or video data stored thereon, and one or more content server(s) 114. In various embodiments, the user 102 may operate the user device 104, which may include one or more processor(s) 106, computer-readable media 108 and a display 110. The content server 114 may also include one or more processor(s) 116 and computer-readable media 118, which may include a filtering module 120, a retrieval module 122, an attribute module 124, a machine learning (ML) module 126, and a data module 128.

In various embodiments, the content server 114 may be a service provider, a service, a video hosting service, or any number of servers or entities that may provide products, services, promotions, articles, advertisements, and/or other media to consumers.

In some embodiments, the user 102 may operate the user device 104 to perform various functions associated with the user device 104, which may include the one or more processor(s) 106, the computer-readable media 108, and the display 110. Furthermore, the user 102 may use the user device 104 to interact with a video, image, article, or other media, to interact with the content server 114, such as via a website or an application associated with a user device 104.

In some embodiments, the user device 104 may be any type of device that is capable of receiving, accessing, searching data and displaying data to the user 102. For instance, the user device 104 may include a personal computer, a laptop computer, a cellular telephone, a PDA, a tablet device, an electronic book (e-Book) reader device, a gaming console, or any other device that may be used to view image data or to access a platform (e.g., website, application, etc.) associated with the content server 114. The user device 104 shown in FIG. 1 is only one example of a user device 104 and is not intended to suggest any limitation as to the scope of use or functionality of any user device 104 used to perform the processes and/or procedures described herein.

The processor(s) 106 of the user device 104 may execute one or more modules and/or processes to cause the user device 104 to perform a variety of functions, as set forth herein. In some embodiments, the processor(s) 106 may include a central processing unit (CPU), a graphics processing unit (GPU), both CPU and GPU, or other processing units or components known in the art. Additionally, each of the processor(s) 106 may possess its own local memory, which also may store program modules, program data, and/or one or more operating systems.

In at least one configuration, the computer-readable media 108 of the user device 104 may include any components that may be used to view, receive, access, input, or otherwise interact with text, audio, image, and/or video data, including data provided by the content server 114 and/or from the database 130. Depending on the exact configuration and type of the user device 104, the computer-readable media 108 may also include volatile memory (such as RAM), non-volatile memory (such as ROM, flash memory, miniature hard drive, memory card, or the like), or some combination thereof. In some examples, the user device 104 may include modules similar or identical to the filtering module 120, a retrieval module 122, an attribute module 124, a machine learning (ML) module 126, and a data module 128.

The user device 104 may use the modules to perform the methods described herein without the need to access the content server 114. For example, the user device 104 may use the modules described herein to determine training datasets, filter video data based on attributes, determine and/or classify new attributes, and generate new machine learning models to identify attributes within video content, or any other technique described herein.

In various embodiments, the user device 104 may also have input device(s) such as a keyboard, a mouse, a pen, a voice input device, a touch input device, etc. The user device 104 may also include the display 110 and other output device(s), such as speakers, a printer, etc. The user 102 may utilize the foregoing features to interact with the user device 104 and/or the content server 114 via the network(s) 112. More particularly, the display 110 of the user device 104 may include any type of display 110 known in the art that is configured to present (e.g., display) information to the user 102.

In some embodiments, the network(s) 112 may be any type of network known in the art, such as the Internet. Moreover, the user device 104, database 130, and the content server 114 may communicatively couple to the network(s) 112 in any manner, such as by a wired or wireless connection. The network(s) 112 may also facilitate communication between the user device 104, database 130, and the content server 114.

In addition, and as mentioned previously, the content server 114 may include the one or more processor(s) 116 and the computer-readable media 118. The content server 114 may also include additional components not listed above that may perform any function associated with the content server 114. In various embodiments, the content server 114 may be any type of server, such as a network-accessible server, and may be one of multiple servers included in a server cluster or server farm. In other embodiments, the processor(s) 116 and the computer-readable media 118 of the content server 114 may be the same as, similar to, or different from the processor(s) 106 and the computer-readable media 108, respectively, of the user device 104.

The filtering module 120 may provide for filtering large-scale video catalogs, such as stored in database 130 with classification and media retrieval models (such as stored in the ML module 126) to increase the efficiency of data collection and lower the burden of manual annotation and thereby improve machine learning model performance and production time for models trained using data from the video catalog stored in database 130. The video data filtering may combine data collection processes with image classification and action classification models to aid in filtering video catalogs for particular attributes.

The filtering module 120 may access video data in the database 130 via the data module 128 and may segment the videos into video clips. The segmentation may be performed by a machine learning model, such as stored in the ML module 126 that may include a video shot boundary detection algorithm that implements color histograms differences to differentiate abrupt shot boundaries in video data from smooth shot boundaries and thereby identify natural breaks in the video data.

After segmenting the video data, the filtering module 120 may select a representative frame, such as a middle frame, first frame, last frame, or other representative frame (e.g., as may be determined by a machine learning model) of each video clip. The filtering module 120 may then access an classification model and a media retrieval model from the ML module 126 to map, via the classification model, images to labels and, via the media retrieval model, images to fixed length embeddings in a representation space with embeddings of source images compared in the representation space based on the distance between the embeddings to determine similarity. The embeddings may include low-dimensional vector representations of discrete variable that may be used to translate high-dimensional vectors. In some examples, the embeddings include a method for representing discrete variable as continuous vectors. Embeddings reduce the dimensionality of category variables and meaningfully represent those categories in the representation space.

In some examples, the filtering module 120 may perform a (1) retrieval process and (2) a selection process. During the retrieval process, both the classification model and the media retrieval model are used to filter the video catalog from the database 130. For the classification model, one or more labels related to particular content of interest (e.g., knife, gun, explosion for violent content) are selected and video shots (e.g., representative frames) that are related (or are predicted to be associated with the one or more labels) with the content of interest are retrieved. The filtering module 120 may then sort the retrieved clips based on the predicted score assigned by the classification model in descending order. The filtering module 120 may then select a subset of the retrieved clips, for example by selecting a top "x" number of results or results over a threshold score. The subset may be selected based on a predetermined threshold of predicted score, a predetermined number of retrieved clips, or other such criteria.

For the media retrieval model, initially, the filtering module 120 may determine one or more query words and/or images that are considered related with the content of interest and may provide the queries into the media retrieval model. The encoder of the media retrieval model may generate one or more embeddings for the input queries. After the embeddings are generated, similarity scores between the embeddings of the queries and the embeddings of the representative frames may be calculated to identify similar content. In some examples, the filtering module 120 may determine the similarity scores by computing the inner product or cosine similarity between the embeddings. The video clips retrieved by the media retrieval model are then sorted in descending order and a subset of the video clips are retained as described above for next steps.

During a selection stage, the filtering module 120 determines a selection of video shots from the subsets retrieved by the classification model and the media retrieval model for validation. The selection may be random or may be according to some predetermined technique. The selected video shots may then be validated to compare the accuracy of the retrieval by the classification model and the media retrieval model. In some examples, the validation may include a manual validation of a handful of results, such as ten or fewer video shots per subset that may be provided to a user for validation of the results. The results having a higher accuracy score (e.g., either the results from the classification model or the results from the media retrieval model) may then be stored as a training dataset for a machine learning model to identify the particular attribute or content identified by the input. Additionally, the filtering module 120 may refine the media retrieval model and/or the classification model through iterative training based on the accuracy scores determined by the validation. For instance, the media retrieval model and/or the classification model may be trained using the results of the more accurate of the two models, or in some examples, the models may be further trained through contrastive learning with the selected video clips labeled as positive instances or negative instances based on the validation.

In some examples, the classification model may an image classification model such as Rekognition®, by Amazon. Rekognition® (or any other service/model that is configured to classify images/objects) may be capable of detecting 2474 pre-defined object categories such as vehicle, table, bag, etc. When the videos of interest do not fall in one of more of these pre-defined categories, the retrieval and selection method mentioned above may be performed as described. However, when the videos of interest are not related with any of the 2474 categories, in some examples only the media retrieval model may be used to determine the training dataset.

In some examples, the media retrieval model may include a media retrieval encoder and a similarity calculator. The media retrieval encoder calculates embeddings from representative frames and queries by fusing the OpenAI CLIP image encoder and the ResNet-50 encoder with multi-head attention. The similarity calculator may determine a cosine similarity or inner product between the embeddings output by the encoder. The media retrieval model can receive inputs of words, images, videos, or both words and images or videos as query input, and output a subset of video clips as the most related video shots. The media retrieval model outputs the subset of video clips by first determining the embeddings for the multimodal inputs using the media retrieval encoder and subsequently determining a similarity between the multimodal inputs and the video content from the database 130 using the similarity calculator based on the embeddings for the multimodal inputs and the embeddings for the video content.

The retrieval module 122 may retrieve video content attributes, that is to say identification and retrieval of video content from the database 130 as similar to input data (e.g., such as input at user device 104), such as text data describing a particular context. Additional input data such as video, audio, or other modalities may also be used to define the attributes. After the input data is provided to a machine learning model, the machine learning model will retrieve video data having similarity scores at or above a threshold with respect to the attribute described by the input.

The retrieval module 122 may access a machine learning model from the ML module 126 that determines or outputs a similarity between a text description (or other multimodal input) and a particular video clip from the database 130. The machine learning model may include two single-modal encoders that individually map the text data (and/or other multimodal inputs) and the video data from the database 130 into the same representation space where a similarity can be observed based on a distance between two vectors, e.g., between the embeddings from the encoders of the text and video data. In doing so, the retrieval module 122 extracts text embeddings using a first encoder and extracts video embeddings based on frame embeddings for a video clip sampled at a particular rate, such as 1 frame per second. After the embeddings are generated by the encoders, a transformer-based header aggregates the representation of both the text embedding and the video embedding and outputs a similarity score. During inference, the retrieval module 122 may generate similarity scores that correlate an input text with a video clip.

In more particular detail, the retrieval module 122 may encode video data from the database 130 and text data with video and text encoders, respectively, and subsequently determine a similarity between the video data and text data using a similarity score determination. For the video embedding generation, in some examples, the retrieval module 122 may determine frame embeddings for representative frames of the video data, with the frame embeddings subsequently aggregated into video embedding using a temporal transformer and frame position embedding. In some examples, the text embedding generation may be performed using a bidirectional encoder representations from transformers (BERT) accessed from the ML module 126 to initially generate token embeddings and subsequently project the token embeddings into the same representation space as the video embedding. In some examples, similar to a text-to-image retrieval machine learning model, contrastive learning may be used to refine the machine learning model used to determine the similarity between the input data and the video data.

In some instances, the retrieval module 122 may use additional modalities of inputs, such as an audio description including a voiceover narration of video data. Such audio descriptions may describe what is happening in the video data during the natural pauses in the audio, and sometimes during dialogue if deemed necessary. The retrieval module 122 may use the audio descriptions for additional similarity determinations, for example by determining a similarity between the audio description and the input data as described above, that is, generating embeddings in one or more different modalities (e.g., text, audio, video) and determining a distance in a shared representation space for the different embeddings.

In some examples, the retrieval module 122 may use an image search model from the ML module 126 to retrieve video data from the database 130 via the data module 128 in response to the video data being associated with or predicted to be associated with particular attributes of the inputs. For instance, in a particular video clip, a representative frame, such as a middle frame, first frame, last frame, or other frame, may be extracted and used to represent a video clip having a short duration (e.g., having a length of about five seconds or less). The representative frame may be selected based on identifying a segment of the video clip, such as a clip lasting a few seconds in duration, and selecting a middle frame of the segment as the representative frame. After representative frames are extracted from the video data, the retrieval module 122 may determine a similarity between input data and each of the representative frames to represent a similarity between the input data and the video clip. In such examples a machine learning model from the ML module 126, such as the OpenAI CLIP model, may be used to determine a text embedding for a text input and the same machine learning model, or in some examples a different model, may be used to determine image embeddings for the representative frames. A video embedding may be calculated from the frame embeddings by mean pooling, or other known aggregation techniques.

The attribute module 124 may be used to generate a repository of scene or frame-level attributes for video content within the database 130 to provide deep understanding of the content within the videos that may be used for various downstream processes such as described above, including compliance, recommendations, product placement, and other such purposes. The attribute module 124 expedites attribute identification for frames and scenes by automatically identifying actions, objects, contexts, and other data about video within a video catalog using one or more machine learning models that may be updated and trained to continually identify additional attributes.

The attribute module 124 may classify video data by using one or more machine learning models from the ML module 126 that can cover a scalable number of attributes that may continue to grow as additional models and/or attributes are identified with models trained to identify such attributes in the video catalog. The attribute module 124 may continue to add to a collection of attributes stored at the database 130 in association with video data stored thereon and continue to provide further context and content labels for an ever-increasing amount of video content. The attribute module 124 may also provide for using one or more pretrained backbones for generating machine learning models combined with a classification layer. The pretrained backbones include a pretrained model that was previously trained on a large dataset, such as on a large-scale image classification task. In some examples, the machine learning models may be generated by a user 102 at the user device 104 using an expedited process to select training data to train the classification layer. In some examples, the pretrained backbones may remain unchanged as additional models are developed and trained, and only the classification layer may be trained or altered by the ML module 126 to classify the particular selected attribute. In some examples, the backbone may include ImageNet, or some other similar model such as a convolutional neural network (CNN).

As described herein, the pretrained backbone for the machine learning models may be stored at the ML module 126 and may be used to identify different attributes may be re-used across multiple different attributes or types of content to enable building a scalable system for continually updating attribute classification of a video catalog. In some examples, a fully supervised model (e.g., a CNN or other such supervised model) may be used for determining embeddings.

In some examples, a semi-supervised approach for a machine learning model may be used to learn from a large quantity of unlabeled data within the video catalog and learn to produce embeddings that may be implemented across other use cases. For instance, a semi-supervised approach may include a teacher-student training framework in which a fully supervised trained teacher model is used to pseudo-label the unlabeled data in order to train the student model on the output of the fully supervised trained teacher model.

In some examples, the attribute module 124 may be configured to generate machine learning models that may receive inputs of multiple different modalities to automate content understanding, search multimedia, and provide an automated utility to build and train new models through a simple user interface to reduce burden and effort to build models for multimedia content understanding across a catalog of multimedia such as videos in database 130. As described herein, the retrieval module 122 may receive different modalities and output attributes for video content, for example to create a set of attributes associated with a particular video file that provide a deeper understanding of the video content without watching the entire video content or relying on a high-level label or annotation that may not provide sufficient detail. The attribute module 124 may also enable searching of the video catalog for new attributes and training new machine learning models to identify the new attribute, and afterwards updating the attributes associated with the videos within the catalog to further improve the understanding of the video content.

In addition to the above, the attribute module 124 provides a process and user interface that may be displayed at the display 110 of the user device 104 in order for the user 102 to train and add new models to identify additional attributes to currently existing models. The user 102 may be guided through the generation of the machine learning model and therefore need not use a sophisticated user device or specialized knowledge from the user 102. To use this service a user can use an image, text, and/or video search to curate new data related to their new attributes. The attribute module 124 may then provide an intuitive interface at the display 110 in which the user can select a type of model and details about the model before training. In some examples, the attribute module 124 may recommend a model type based on the inputs provided by the user. The user may then select data for training the model using clusters of data to quickly define training datasets that may be used to train a new model with click of a button.

The machine learning (ML) module 126 may include one or more machine learning models that may perform one or more tasks as described herein, including individual identification, object identification, face recognition, image classification, attribute classification, feature recognition, feature scoring, and ranking of sets of data based on one or more scores. For example, several suitable algorithms are available on the market, including the FaceVACS® software by Cognitec Systems GmbH, FaceSDK offered by Luxand, Inc., Rekognition® by Amazon, Inc., CLIP by OpenAI, and FaceRecognizer by OpenCV. In some examples, the models may include machine learning models such as ResNet, EfficientNet, and FaceNet in combination with one or more other models or as standalone models.

In some examples, the ML module 126 may include access to or versions of multiple different machine learning models that may be implemented and/or trained according to the techniques described herein. Any suitable machine learning algorithm may be implemented by the ML module 126. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

The data module 128 may maintain or be associated with one or more sources of data including text, audio, image, and/or video data accessed from the user device 104, the content server 114, and/or the database 130. The data module 428 may include one or more databases or access to one or more databases including text, audio, image, and/or video data. In some examples, the data module 128 may be configured to manage delivery of video content or other data from the database 130 to the user device 104 via the network 112.

In a particular example, a user 102 may wish to filter content from video data in a catalog (stored in the database 130) to identify training data for a machine learning model, for example to train a model to identify particular content such as advertising content within video data. The user 102 may access the content server 114 vie the user device 104 and input examples of advertising including text descriptions, text examples, image examples, video examples, and other related multimodal inputs. The content server 114 will, via the filtering module 120, receive the multimodal input and use the image classifier model and the media retrieval model to determine sets of video data that include advertising data as described above. After determining the sets of video data, the user may train a new machine learning model to identify advertising instances in video content, and potentially to replace or tag the instances for potential advertising placement in post-processing.

In a second particular example, the user 102 may attempt to retrieve video content from the database 130 based on multimodal inputs. For instance, the user 102 may use one or more techniques described herein to identify copyright protected content within the video database to remove the protected content. The user may provide one or more multimodal inputs to the retrieval model 122, which may use the media retrieval model to identify the copyright protected content within the database using any and/or all of the multimodal inputs.

In a third particular example, the user 102 may wish to develop a repository of attributes of video data to provide a content understanding of the video data without manually tagging the content, and may wish to continually add new attributes to the repository. For example, the user may first want to identify video scenes and/or frames with alcohol content, violent content, or other particular content. In subsequent examples, the user may wish to identify instances of a presence of an object, a location, or other information related to the video content at the scene and/or frame level. Accordingly, the user may train models to identify the various attributes as desired, the models used on the video database to identify and provide the content understanding of the video. The repository may be continually added to with additional detail such that attributes (including timestamps of the instances) for the video content provide a summary of all the content of the video in a manner searchable by one or more algorithms.

Figure 2:
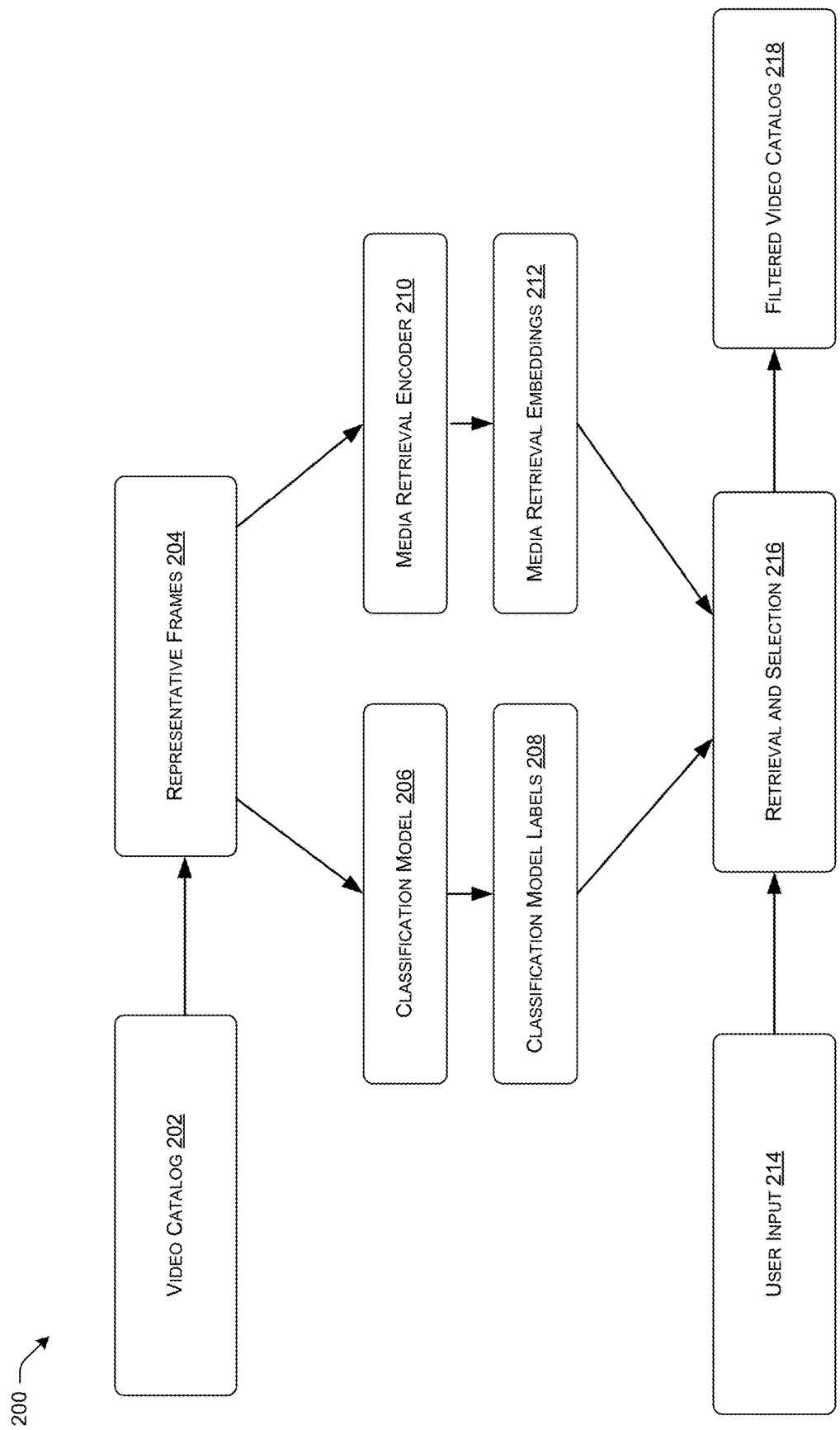
FIG. 2 illustrates a video filtering system using classification and content-based image retrieval models, according to at least some examples.

FIG. 2 illustrates a video filtering system 200 using classification and content-based image retrieval models, according to at least some examples. The video catalog 202 may include the videos stored in the database 130 of FIG. 1 or other collections of video data. The video catalog 202 may include any number and format of video data, and may include an ever expanding number of videos as well. The video catalog 202 may be stored in a database and have metadata and/or other data stored in association with the videos, with the metadata or other data describing annotations, attributes, tags, and other information regarding the videos.

The video catalog 202 is filtered according to the system 200, and the video filtering system 200 may include one or more subsystems or modules that may be performed or configured to be carried out by the filtering module 122 of FIG. 1. The video filtering system 200 may be used to filter the video catalog 202 to increase the efficiency of data collection, for example for collecting training data for a machine learning model, and lower the burden of manual annotation and thereby improve machine learning model performance and production time for models trained using data from the video catalog 202. The video filtering system 200 may combine data collection processes with image classification and action classification models to aid in filtering video catalogs for particular attributes.

The video catalog 202 is processed in the video filtering system 200 by selecting representative frames 204 of the videos such that image processing models may process the representative frames 204. The video filtering system 200 may segment the videos of the video catalog 202 into video clips. The segmentation may be performed by a machine learning model, such as a video shot boundary detection algorithm that implements color histograms differences to differentiate abrupt shot boundaries in video data from smooth shot boundaries and thereby identify natural breaks in the video data. In some examples, the videos may be segmented by dividing the videos into segments of fixed length, for example into clips of five seconds or less without respect to boundaries between shots.

After segmenting the video data, the video filtering system 200 may select a representative frame, such as a middle frame, first frame, last frame, or other representative frame (e.g., as may be determined by a machine learning model) of each segment. The representative frame may be an image that may be used in place of the segment of video data for processing by the video filtering system 200.

The video filtering system 200 then includes a classification model. The classification model 206 may include a machine learning model that recognizes classes of objects or images of objects from image data, such as the classification model labels 208. In some examples, the classification model 206 may include a computer vision algorithm, such as such as Rekognition®, by Amazon. Rekognition® may be capable of detecting 2474 pre-defined object categories such as vehicle, table, bag, etc. Additional examples of classification models may include VGG-16 developed by the University of Oxford, Inception (also referred to at GoogLeNet) by Google, Inc., ResNet50 (or another ResNet model), or EfficientNet by Google, Inc.

The video filtering system 200 also includes a media retrieval encoder 210. The media retrieval encoder 210 calculates embeddings from the representative frames 204 and then delivers the media retrieval embeddings 212 for determining a similarity score. The media retrieval encoder 210 may, for example include the OpenAI CLIP image encoder and the ResNet-50 encoder with multi-head attention. The media retrieval encoder 210 may generate one or more embeddings for the video catalog based on the representative frames 204.

The video filtering system 200 performs retrieval and selection 216 using the classification model labels 208 and the media retrieval embeddings 212. The retrieval and selection 216 may include two different processes. During the retrieval process, both the classification model 206 and the media retrieval encoder 210 are used to filter the video catalog 202. In particular, the classification model 206 is used to produce the classification model labels 208 related to particular content of interest (e.g., knife, gun, explosion for violent content) as identified by a user input 214. The video filtering system 200 then sorts the representative frames 204 (and therefore the associated video clips) based on the predicted score assigned by the classification model 206 in descending order. At retrieval and selection 216, a subset of the representative frames 204 are selected, for example by selecting a top "x" number of results or results over a threshold score. The subset may be selected based on a predetermined threshold of predicted score, a predetermined number of retrieved clips, or other such criteria.

The media retrieval encoder 210 model may generate one or more media retrieval embeddings 212 embeddings for the representative frames 204. After the embeddings are generated, at retrieval and selection 216, the user input 214, which may include text, video, audio and image data may be embedded by the media retrieval encoder 210 to produce an embedding in the same representation space as the media retrieval embeddings 212. Afterwards, similarity scores between the media retrieval embeddings 212 and the embeddings of the user input 214 may be calculated to identify similar content, e.g., content that is similar to the content requested by the user input 214. In some examples, at retrieval and selection 216, the similarity scores may be determined based on an inner product or cosine similarity between the embeddings. The video clips are then sorted in descending order according to the similarity scores of the representative frames 204 determined based on the media retrieval embedding distance from the embedding of the user input 214

During a selection stage of retrieval and selection 216, the video filtering system 200 determines a selection of video shots from the subsets retrieved at the retrieval stage, by the classification model 206 and the media retrieval encoder 210 for validation. The selection may be random or may be according to some predetermined technique. The selected video shots may be validated to compare the accuracy of the retrieval via the classification model 206 and retrieval via the media retrieval encoder 210. In some examples, the validation may include a manual validation of a handful of results, such as ten or fewer video shots per subset that may be provided to a user for validation of the results. The results having a higher accuracy score (e.g., either the results from the classification model or the results from the media retrieval encoder 210) may then be stored as a training dataset for a machine learning model to identify the particular attribute or content identified by the input. Additionally, media retrieval encoder 210 and/or the classification model 206 through iterative training based on the accuracy scores determined by the validation. For instance, the media retrieval encoder 210 and/or the classification model 206 may be trained using the results of the more accurate of the two models, or in some examples, the models may be further trained through contrastive learning with the selected video clips labeled as positive instances or negative instances based on the validation.

The selected results from retrieval and selection 216, the results selected based on accuracy of the models, may then be output as a filtered video catalog 218. The filtered video catalog 218 may be a set of video data selected from the video catalog 202 that may be used for other purposes, such as training other machine learning models to identify particular content or attributes, based on the user input 214.

Figure 3:
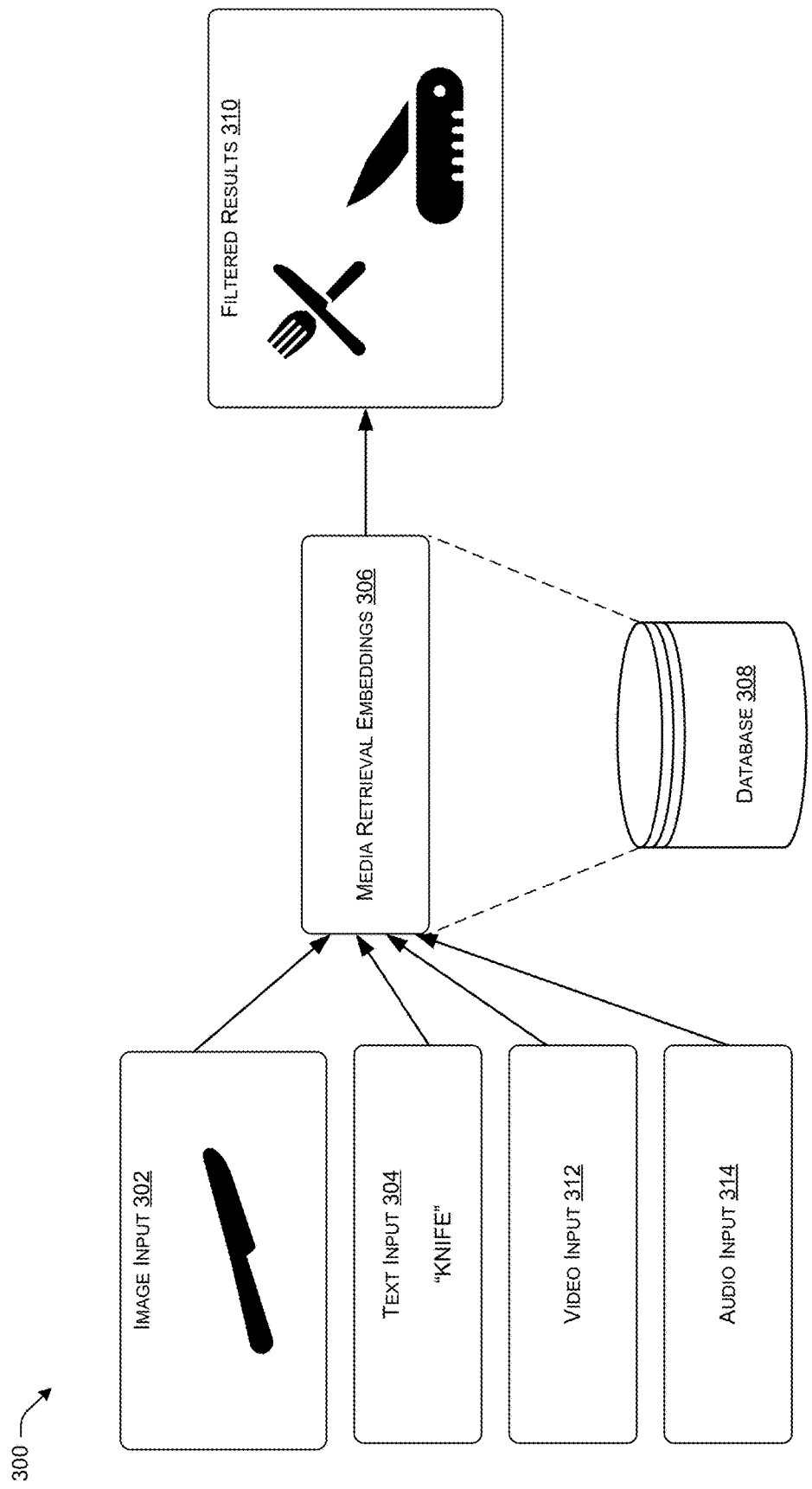
FIG. 3 illustrates a content-based media retrieval model for filtering video content, according to at least some examples.

FIG. 3 illustrates a content-based media retrieval model (media retrieval model 300) for filtering video content, according to at least some examples. The media retrieval model 300 receives multimodal inputs, such as an image input 302 of a knife according to a particular example, and a text input 304 including the word "knife." The inputs may also include video inputs 312 and audio inputs 314 that may be provided to the media retrieval model 300. The media retrieval model 300 includes media retrieval embeddings 306 that may be determined based on the inputs and may be used to produce filtered results 310 from a database 308, for example as described above with respect to FIG. 2. The filtered results 310 may be multimodal and include results that may be video, image, text, and/or audio results.

In particular, the media retrieval embeddings 306 may be produced by different encoders based on inputs provided to the media retrieval model 300. A first encoder for producing the media retrieval embedding 306 may include a first image encoder. The first image encoder may, for example include the CLIP image encoder model from OpenAI with a ResNet-50 model. The two models may be combined through multi-head attention. A second encoder for producing the media retrieval embedding 306 may include a second image encoder, such as just the CLIP image encoder. A third encoder for producing the media retrieval embedding 306 may include an encoder for processing text, such as a CLIP text encoder from OpenAI.

The multiple different encoders may be used to produce the media retrieval embeddings 306. In the event that the user input is a single image, such as the image input 302, then the first encoder may be used on representative frames from the video data in the database 308 and the first encoder may also be used on the image input 302. In another example, if a text input 304 is provided alone, then the first encoder may be used for determining embeddings of the video data from the database 308 and the third encoder (e.g., the text encoder) may be used to produce an embedding for the text input 304. The embeddings produced by the different encoders result in embeddings or vectors that exist in a similar representation space and may therefore be compared for similarity based on a distance between the embeddings in the representation space. In the event that the media retrieval model 300 receives both an image input 302 and a text input 304, then the first encoder is used to produce an embedding for the image input 302 and the third encoder is used to produce an embedding for the text input. The embeddings may then be merged to form a new embedding that represents both of the multimodal inputs. In such examples, the video data may be processed through the first encoder and the second encoder to produce two embeddings for the video data. The two embeddings may then be merged into a single embedding for the video data. The merged embedding for the inputs and the merged embedding for the video data may then be compared together to determine a similarity and thereby produce the filtered results 310.

Though described with respect to an image encoder, the media retrieval model 300 may receive video inputs additionally. Video inputs may be processed by a video encoder in some examples. In some examples, the video inputs may be segmented and have representative frames extracted as described herein that may be processed by image encoders.

Figure 4:
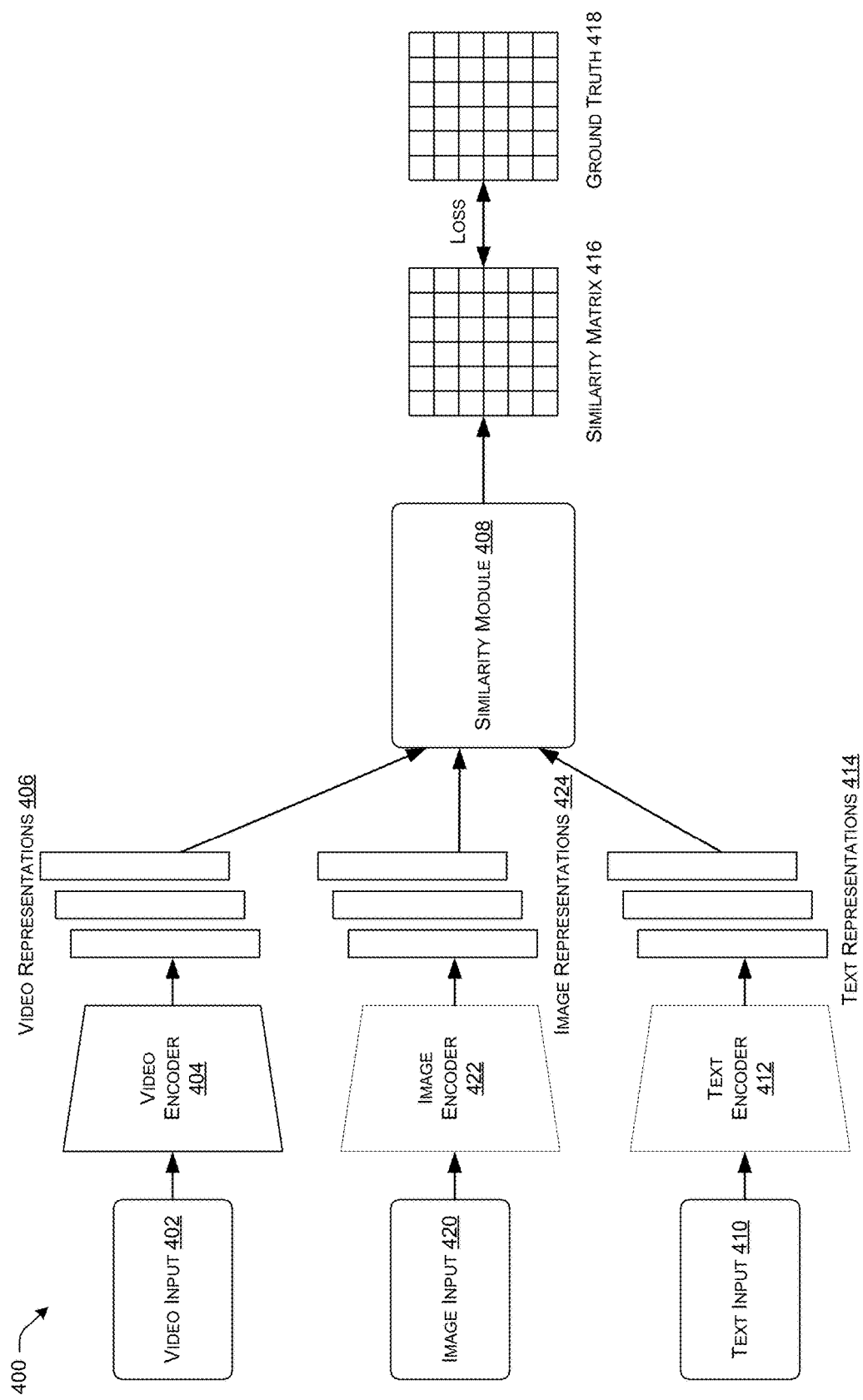
FIG. 4 illustrates a multimodal model for video retrieval, according to at least some examples.

FIG. 4 illustrates a multimodal model 400 for video retrieval, according to at least some examples. The multimodal model 400 may be contrasted against typical unimodal models for video retrieval. In a typical unimodal model for video retrieval, videos are processed through an encoder and classifier to produce a vector of predictions and labels are mapped onto the vector. In the multimodal model 400, the labels are processed through a parallel model with the video data to identify similarities between data based on the semantic information of the label itself. The multimodal model 400 may be an example of a model that may be implemented to determine similarity using multimodal inputs, such as described above with respect to the media retrieval model 300 of FIG. 3.

In particular, the multimodal model 400 receives video input 402 and text input 410 into separate encoders, such as the encoders discussed with respect to the media retrieval model 300. In some examples, the multimodal model 400 may also receive image input 420 to an image encoder 422. The video encoder 404 may produce embeddings that may be video embeddings, or may be the image embeddings described above. Similarly, the text encoder 412 may produce embeddings for the text input 410. The image encoder 422 may produce embeddings for the image input 420. The video representations 406, the text representations 414, and the image representations 424 may include classifiers or layers for aggregating multiple embeddings into a single embedding for feeding to the similarity module 408. The multiple embeddings may be combined using different aggregation techniques such as mean pooling, a transformer encoder, and/or a transformer encoder with a long short-term memory (LSTM) neural network. The aggregation may be used to aggregate frame embeddings into a video embedding for the video input 402 for example, or to combine embeddings for multiple different text inputs 410.

The similarity module 408 may receive the embeddings and determine a similarity matrix 416. The similarity matrix 416 may be an output of the similarity module 408 and may include similarity scores and/or distances between the different embeddings compared at the similarity module through cosine similarity or other similarities. In some examples, the similarity module 408 may be an example of a transformer based header used to determine the distance (e.g., similarity) between different embeddings. Ground truth 418 may be used for a loss calculation within the multimodal model 400, for example to train the pipelines for the video input 402 and/or for the text input 410.

Figure 5:
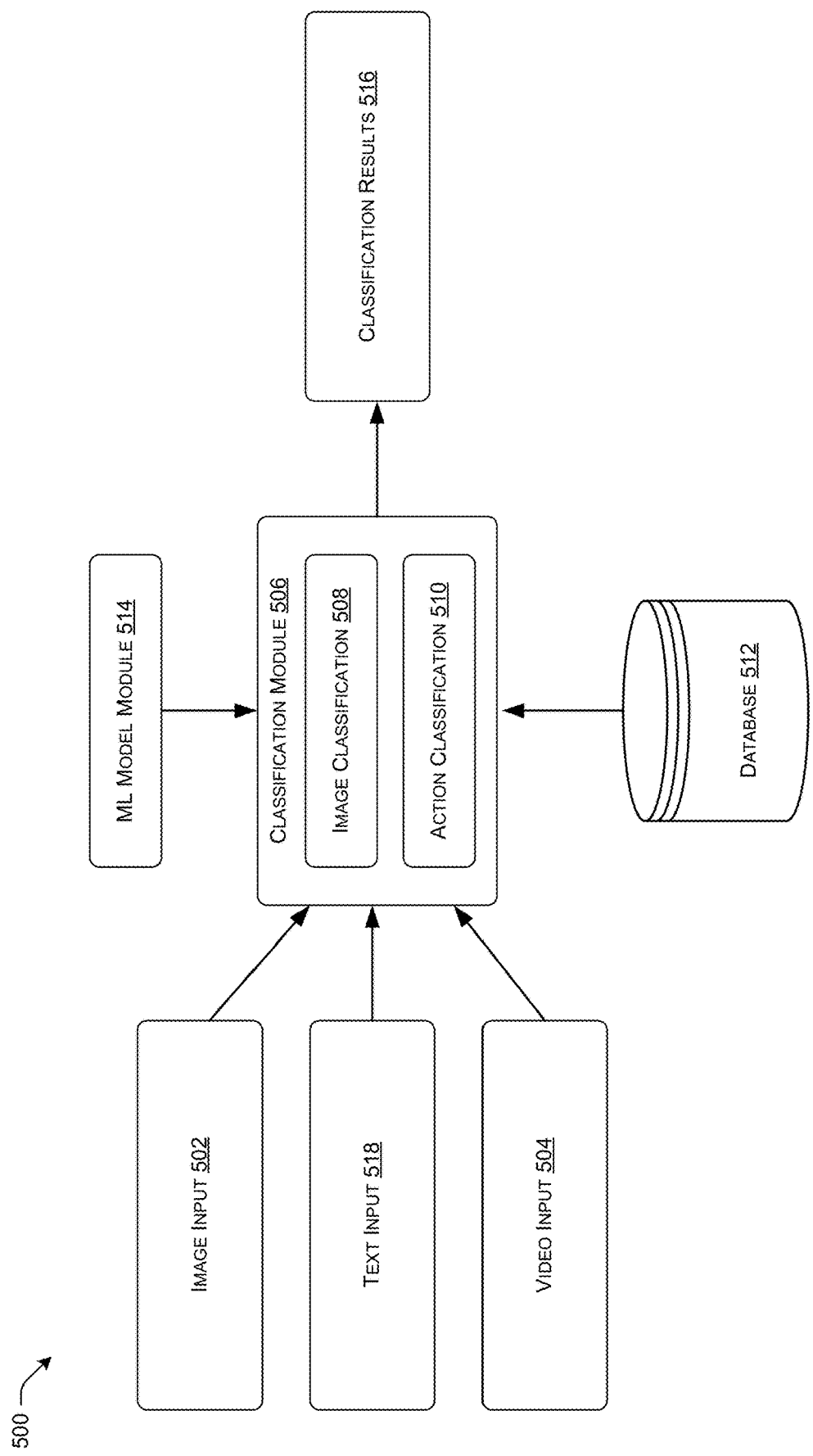
FIG. 5 illustrates a classification pipeline for image and video classification by attributes, according to at least some examples.

FIG. 5 illustrates a classification pipeline 500 for image and video classification by attributes, according to at least some examples. The classification pipeline 500 includes an image classification modality and an action classification modality that may be used for video inputs. The classification pipeline 500 may be implemented by the attribute module 124. The classification pipeline 500 is used to determine classification results for image and/or video data and associated scores with each of the different classifications.

For example, the classification pipeline 500 may be used to determine frame or scene-level attributes for video content within a database 512 to provide deep understanding of the content within the videos that may be used for various downstream processes such as described herein, including compliance, recommendations, product placement, and other such purposes. The classification pipeline 500 automatically identifies, using one or more machine learning models from a ML model module 514 that may be the same as the ML module 126 of FIG. 1, actions, objects, contexts, and other data about video within the database 512.

The classification pipeline 500 receives an image input 502 and/or a video input 504 and/or a text input 518 to the classification module 506. The classification module 506 may classify video data from the database 512, which may include or be similar to the database 130, by using one or more machine learning models from the ML model module 514 that can cover a scalable number of attributes that may continue to grow as additional models and/or attributes are identified with additional ML models trained to identify such attributes in the video catalog. The classification module 506 may continue to add to a collection of attributes stored at the database 512 in association with video data stored thereon and continue to provide further context and content labels for an ever-increasing amount of video content.

The image classification 508 may perform inference using one or more machine learning models to identify classification results 516 describing content within the image input 502. The action classification 510 may perform inference using one or more machine learning models to identify classification results 516 describing content at a scene level within the video data. The action classification 510 may be performed on segments of video data, for example by dividing the video input 504 into clips having a length of five seconds or less, or in some examples based on scene determinations as described herein with respect to color-histogram identification to identify natural breaks in the video data. The image classification 508 and action classification 510, among other modules, may be used by the classification model. The classification results 516 can include outputs for multiple different attributes simultaneously for a set of data. The classification results 516 can include, for example, scene-level attributes, object level attributes, location level attributes, and action level attributes.

Examples of fully supervised and semi-supervised machine learning models for use by the classification module 506 are shown and described with respect to FIGS. 7 and 8 below.

Figure 6:
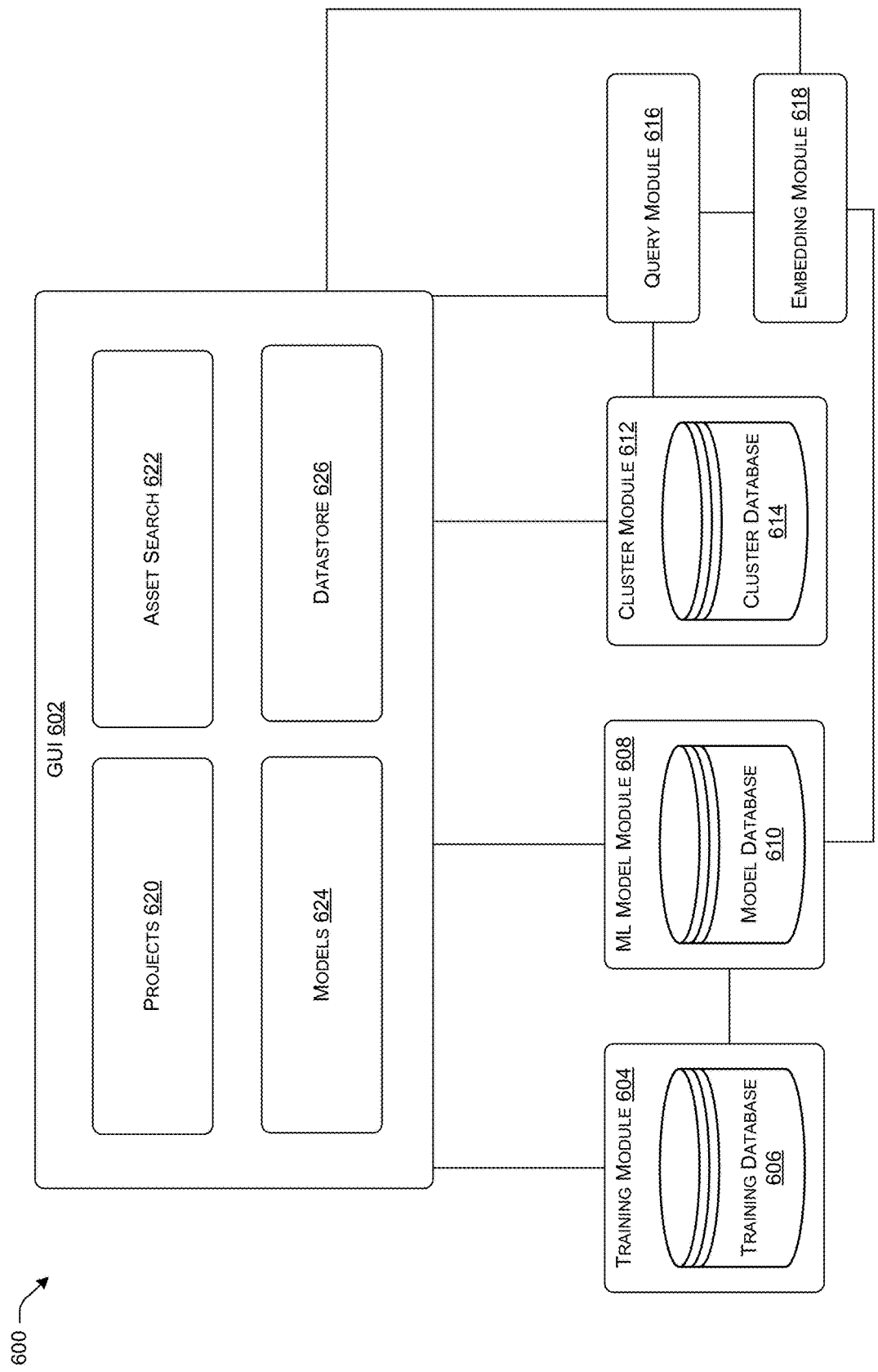
FIG. 6 illustrates an architecture for machine learning model generation and use for video content classification, according to at least some examples.

FIG. 6 illustrates an architecture 600 for machine learning model generation and use for video content classification, according to at least some examples. The architecture 600 may enable generation and use of machine learning models for determining attributes associated with video data and searching attributes associated with video data to identify and retrieve particular video data results. The architecture 600 may include elements hosted on the content server 114 and/or on the user device 104 of FIG. 1. For example, the GUI 602 may be presented or hosted on the user device 104 while the training module 604, ML model module 608, cluster module 612, query module 616, and embedding module 618 may be hosted on the content server 114.

The ML model module 608 may be configured to manage ML model storage and discovery. The ML models may be stored in a framework agnostic format. The ML model module 608 enables the GUI 602 to access models via model component 624 to identify previously trained models for determining attributes or to identify models for training to identify additional attributes. The ML model module 608 may include a model database 610 that stores various types and configurations of ML models and the ML model module 608 may be configured to adjust one or more parameters of the ML models based on inputs via the GUI 602. the ML model module 608 may be similar to or include components of the ML module 126 of FIG. 1.

The training module 604 may be used to train the ML models of the ML model module 608 using training data from the training database 606. The training module 604 may be used for initial training as well as refinement of the various ML models.

The cluster module 612 is configured to divide embedding spaces, such as produced by encoders, into clusters, with indexed items labeled based on a nearest cluster. The cluster module 612 may include a cluster database 614 that describes locations and identities of various clusters within embeddings. The cluster module 612 may be used for training data discovery and searching by using the clusters for relevance ranking. For example, items closer to a center or centroid of a cluster may be considered more relevant than items at a greater distance (within the representation space) from the center of the cluster.

The query module 616 is configured to receive queries from the GUI 602 and power queries through the different trained ML models or other systems of the architecture 600. The query module 616 is configured to receive multimodal inputs including text, audio, image, and video data.

The embedding module 618 is configured to determine embeddings for inputs received at the query module 616 and may use one or more encoders stored at the model database 610 to determine the embeddings. The embeddings may be used for similarity determinations and may be used for various purposes at the GUI 602.

The GUI 602 provides components for selecting projects 620, performing asset searches 622, viewing and modifying models 624, and viewing and/or interacting with data through a datastore 626. The projects 620 may include, for example, previous ML models trained to identify attributes within video data that may be re-run or used for other purposes. The asset search 622 may be used to search the trained ML models, such as those previously produced, search video data, search attributes, or otherwise search one or more components within the architecture 600.

Figure 7:
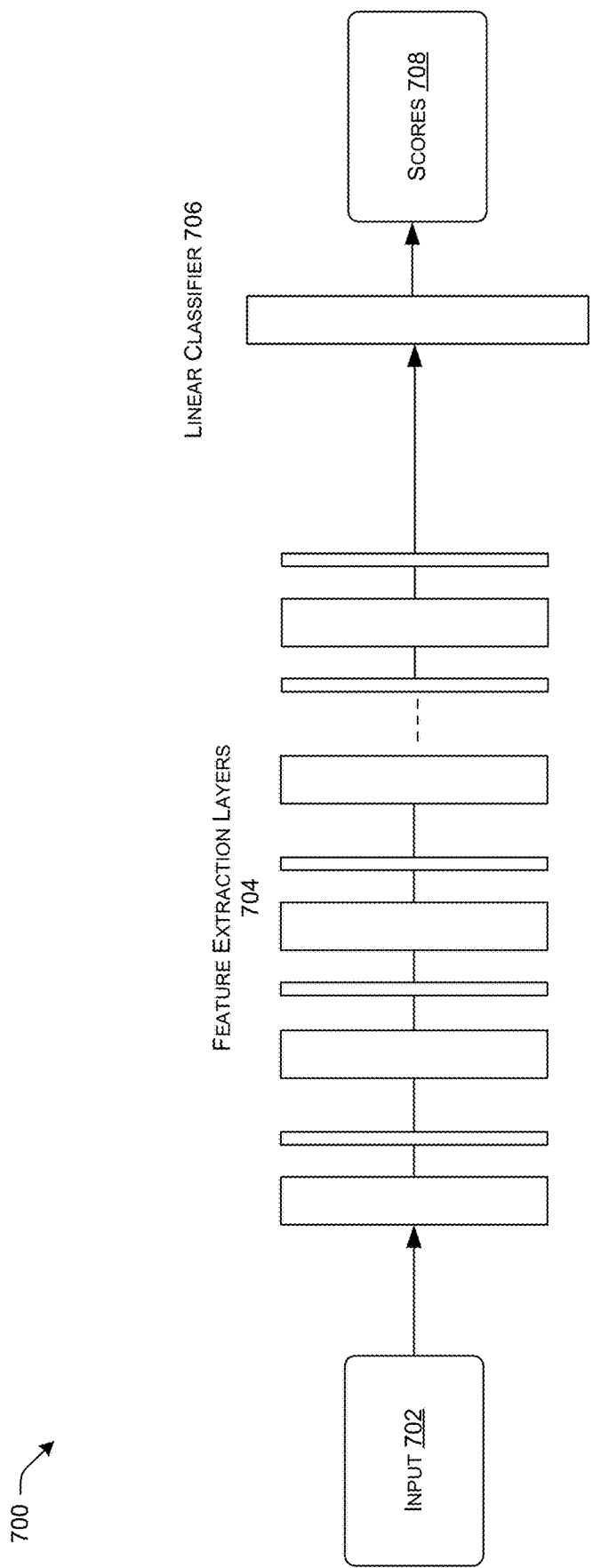
FIG. 7 illustrates an example video classification model using a feature extraction backbone followed by a linear classifier, according to at least some examples.

FIG. 7 illustrates an example video classification model 700 using a feature extraction backbone followed by a linear classifier, according to at least some examples. The attribute classification described herein is scalable to numerous attributes and may be scalable to any conceivable attributes by training a model to identify the attributes within video data, for video classification as described herein. Accordingly, the video classification model 700 may be an example of a fully supervised model with a pretrained backbone and using a linear classifier 706 that may be trained for a particular attribute. In this manner, the video classification model 700 may be trained for any attribute classification by training only the linear classifier 706.

The video classification model 700 shares embeddings across all attributes classified by the model, but has individually trained linear classifiers 706. The feature extraction layers 704 may be an example of a pretrained backbone for the video classification model 700, that may be a convolutional neural network or other form of machine learning model. For instance, the feature extraction layers 704 may include ImageNet or other similar models.

The video classification model 700 may be used to classify images and/or videos through the use of two dimensional or three dimensional layers for the feature extraction layers 704. For image inputs, a two dimensional convolution layer may be used for embedding the input 702 and providing the embedding to the linear classifier 706. For video inputs, a three dimensional convolution layer may be used for embedding the input 702 and providing the embedding to the linear classifier 706. In some examples, other models such as transformer networks may be implemented in the place of the feature extraction layers 704. The linear classifier 706, trained for one or more attributes, may produce scores indicative of a probability that the input 702 is associated with the one or more attributes and can therefore perform multi-attribute labeling for data input into the video classification model 700.

Figure 8:
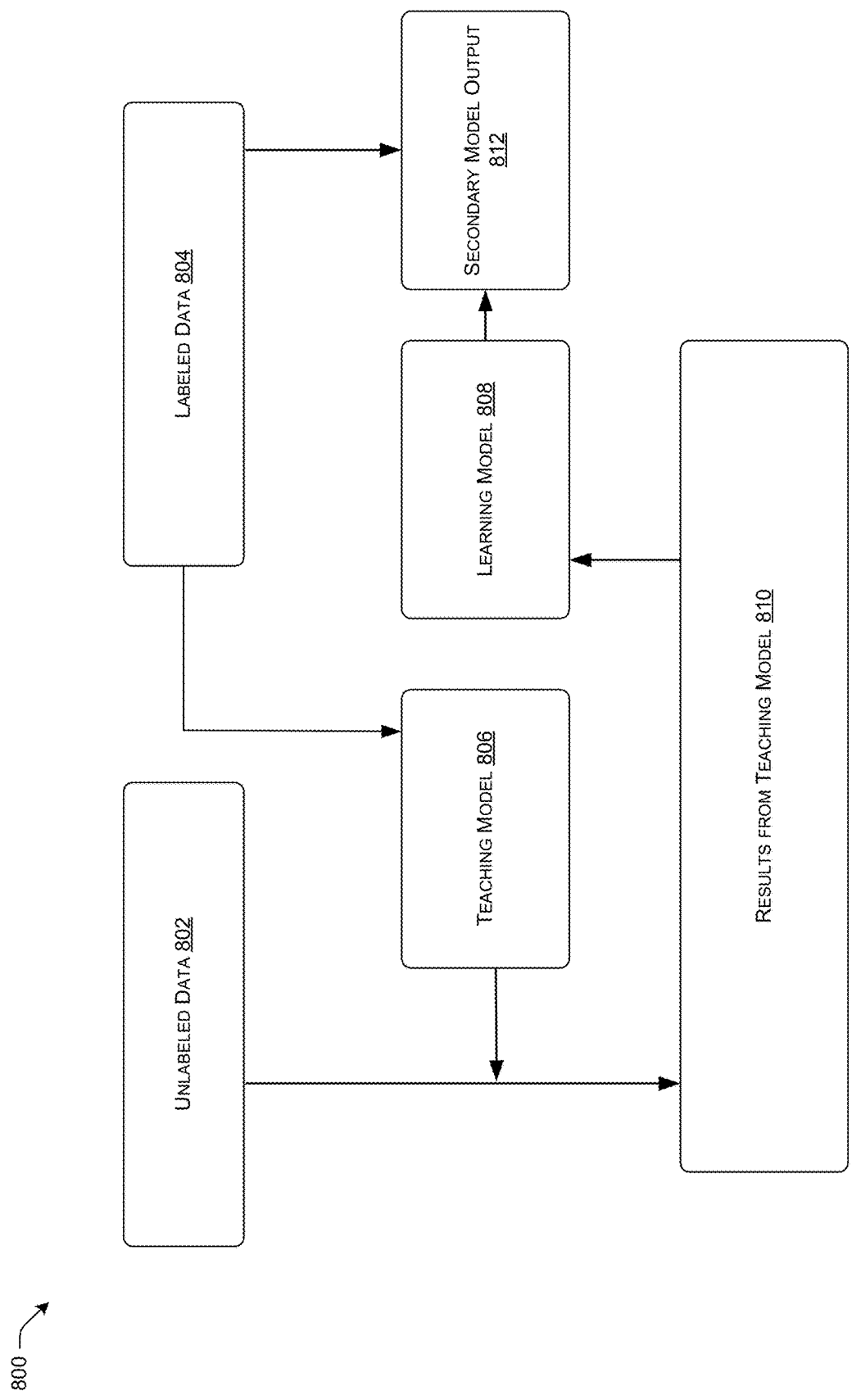
FIG. 8 illustrates a semi-supervised technique for video classification, according to at least some examples.

FIG. 8 illustrates a semi-supervised technique 800 for video classification, according to at least some examples. In some examples, the machine learning models used for attribute classification may be semi-supervised. In order to re-use the embeddings, via the pretrained backbone as discussed herein, a semi-supervised technique 800 may be used to learn representation and feature extractors specific to the video catalog. Some available machine learning models are trained using academic training datasets that may not have or exhibit real-world variability. Accordingly, the semi-supervised technique 800 may be used to learn from a large amount of unlabeled data, such as a video catalog, and learn improved embeddings for further use by ML models sharing the pretrained backbone.

In the semi-supervised technique, a teaching model 806 may be fully trained on labeled data 804, such as with a fully supervised model as described with respect to FIG. 7 that is trained on a training dataset. The teaching model 806 is used to run inference on unlabeled data 802, such as the video catalog. The teaching model 806 is also used to identify top results from the inference on the unlabeled data 802. The results from the teaching model 806 inference on the unlabeled data 802, which may include labels applied to the unlabeled data 802 or may include only a selection of the top results from the inference on the unlabeled data 802.

The learning model 808 may be trained using the results from the teaching model 810, such as the top results described above. The learning model 808 may subsequently be refined using the original labeled data 804 by continuing to refine the learning model with training using the labeled data 804.

In this manner, the semi-supervised technique 800 may be used to identify attributes within video data from real-world data having high variability that an off-the-shelf machine learning model may not be trained to accommodate.

Figure 9:
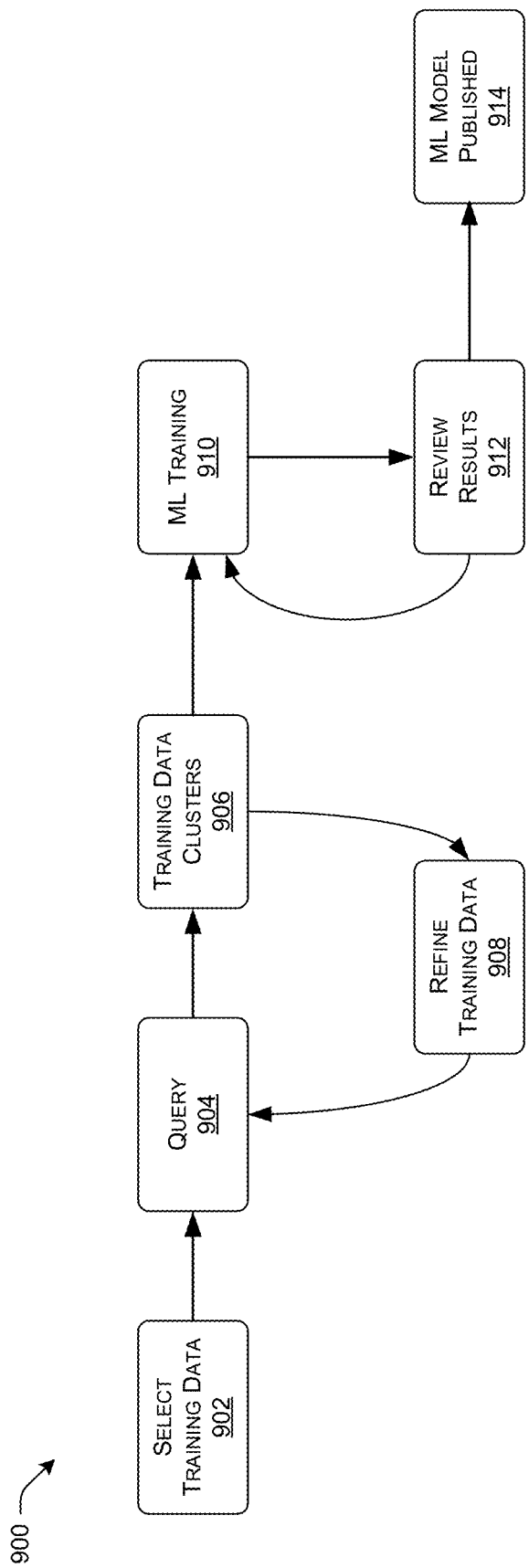
FIG. 9 illustrates an example technique for machine learning model generation for video content classification, according to at least some examples.

FIG. 9 illustrates an example technique 900 for machine learning model generation for video content classification, according to at least some examples. The example technique 900 is illustrated in FIG. 9 and further illustrated with respect to various user interface examples in FIGS. 10-14 below.

In some examples, the example technique 900 may be used to generate machine learning models that may receive inputs of multiple different modalities to automate content understanding and search multimedia based on attributes. As described herein, a classification system may receive different modalities and output attributes for video content, for example to create a set of attributes associated with a particular video file that provide a deeper understanding of the video content without watching the entire video content or relying on a high-level label or annotation that may not provide sufficient detail. The classification system may rely on machine learning models generated according to the example technique 900.

The example technique 900 may provide a process to train and add new models to identify additional attributes to currently existing models. To use this service a user can use an image, text, and/or video search to curate new data related to their new attributes. The classification system may then provide an intuitive interface in which the user can select a type of model and details about the model before training. In some examples, the system may recommend a model type based on the inputs provided by the user. The user may then select data for training the model using clusters of data to quickly define training datasets that may be used to train a new model with click of a button.

In the example technique 900, a user initially uploads some type of media, such as text, audio, image, and/or video data associated with the attribute the model will be trained to identify as the query 904. The example technique 900 may generate embedding values from the user input and the embedding values may be used according to a retrieval process described herein to identify data from a catalog that may be used as training data at 902.

The example technique 900 uses the query 904 and the embeddings to find training data clusters 906. The training data clusters 906 may divide an embedding spaces, such as produced by encoders, into clusters, with indexed items labeled based on a nearest cluster. The training data clusters may be used for training data discovery and searching by using the clusters for relevance ranking. For example, items closer to a center or centroid of a cluster may be considered more relevant than items at a greater distance (within the representation space) from the center of the cluster.

In a refining step 908, the training data may be validated or verified to indicate which of the samples and/or clusters identified do not match the desired results from the ML model. The validation may include a manual validation on a subset of the data, such as manual validation of individual results and/or of clusters to identify positive instances and negative instances within the initially selected training data.

The example technique then refines the training data clusters 906 based on the refining step 908, the query 904, and the embeddings from selecting the training data 902. The refinement step 908 may be iterated until a user approves of the selected results within the training data, such as by approving the clusters of data or representative data.

After the training data is accepted, the example technique 900 includes training the machine learning model using the accepted training data. The machine learning model may be trained at 910. The newly trained machine learning model may then be used to perform inference on unlabeled data for evaluation of performance at the review step 912. The evaluation may include a human verification of selected random results or other verification of the results where the labels may be verified. In response to the machine learning model passing the review step 912, the machine learning model may be published at 914. In response to the machine learning model not passing the review step 912, additional input may be provided by the review step, such as to identify negative instances within the selected results to review that may be used to continue training the machine learning model 910.

FIGS. 10-14 illustrate example user interfaces for training a machine learning model using a simplified process to identify attributes within video data using a pretrained backbone and linear classifier as described herein. The user interfaces may be an example of a web browser or other application that may be hosted on the user device 104 and enable a user 102 to generate, modify, or run machine learning models for attribute classification within video data.

Figure 10:
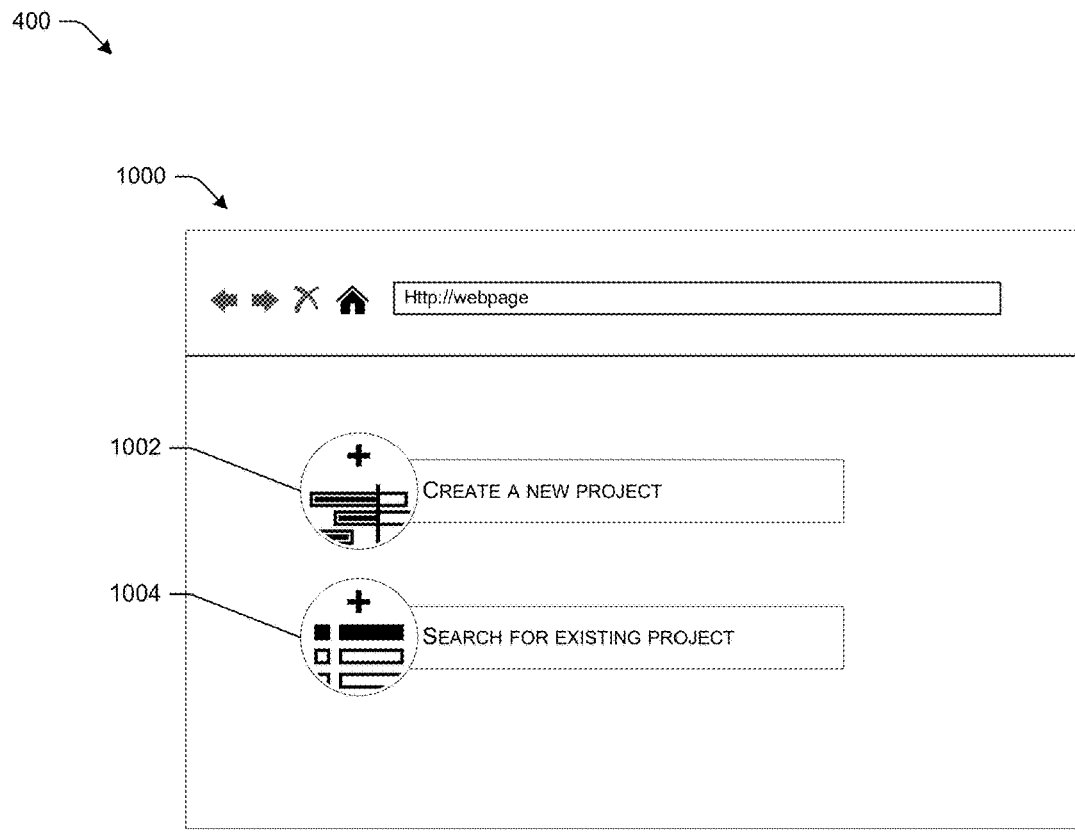
FIG. 10 illustrates an example user interface illustrating a technique for machine learning model generation for video content classification, according to at least some examples.

FIG. 10 illustrates an example user interface 1000 illustrating a technique for machine learning model generation for video content classification, according to at least some examples. The user interface 1000 may be an example of a web browser or other application that may be hosted on the user device 104 and enable a user 102 to generate, modify, or run machine learning models for attribute classification within video data.

The user interface 1000 includes an option to create a new project 1002 or search for an existing project 1004. The new project 1002 may be selected to enable the user to generate a new machine learning model. The existing project 1004 may be selected to prompt the user 102 to input information that may be used to identify one or more existing models that may be used to classify the attributes desired by the user.

Figure 11:
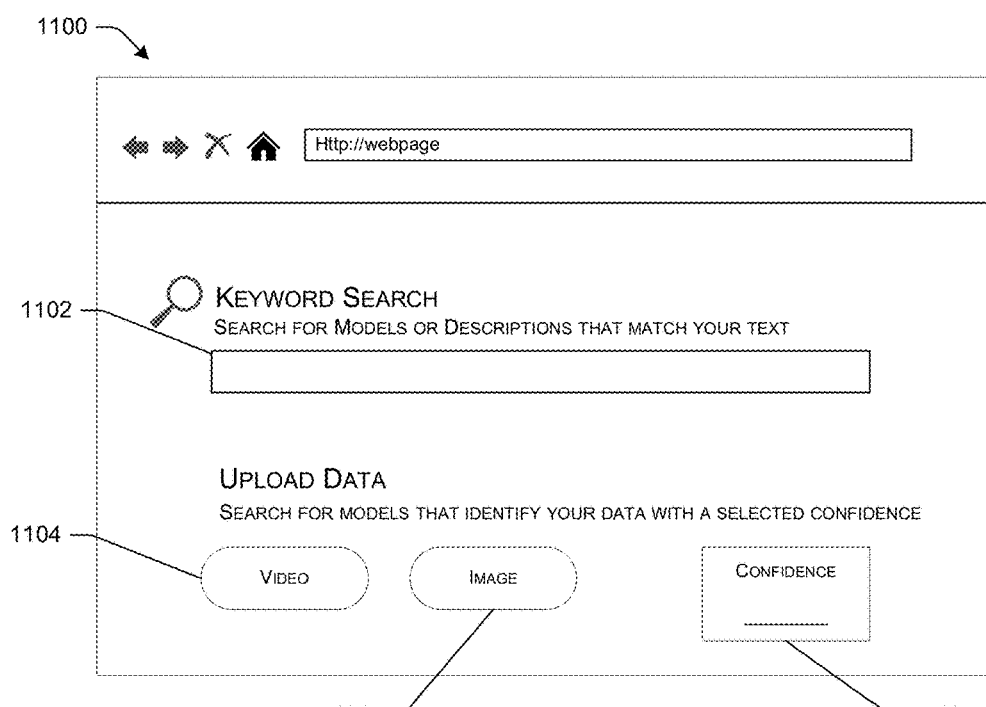
FIG. 11 illustrates an example user interface illustrating a technique for machine learning model generation for video content classification, according to at least some examples.

FIG. 11 illustrates an example user interface 1100 illustrating a technique for machine learning model generation for video content classification, according to at least some examples. In the user interface 1100, the user 102 may search for models using a keyword search 1102 or may upload data that may be used to identify models. For example, the user may upload video data 1104 or image data 1106 and the system hosting the user interface 1100 may identify an attribute within the video data 1104 or image data 1106 and may then determine one or more models associated with the attribute.

In some examples, the user interface 1100 may enable a user to specify one or more additional parameters 1108 for a machine learning model. The additional parameters may include a confidence score or other parameters that may establish a threshold confidence score with which a machine learning model returned by the search needs to identify the attributes of the video data 1104 and/or the image data 1106.

Figure 12:
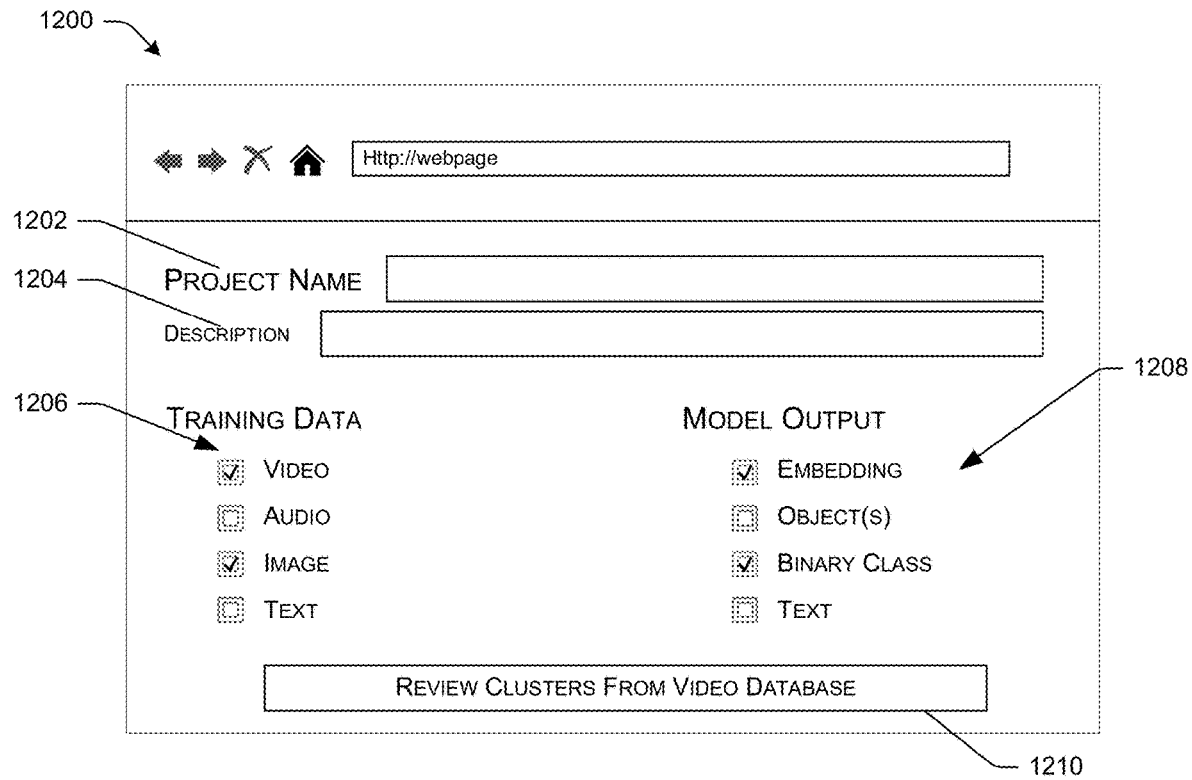
FIG. 12 illustrates an example user interface illustrating a technique for machine learning model generation for video content classification, according to at least some examples.

FIG. 12 illustrates an example user interface 1200 illustrating a technique for machine learning model generation for video content classification, according to at least some examples. The user interface 1200 may be used to modify an existing project or determine characteristics for a new project. The user interface 1200 includes prompts for naming the model at 1202 and describing the model at 1204 such that the model may be accessed or found later by others searching using a keyword search for a model to identify the selected attribute.

The user interface 1200 also includes options for identifying types of training data at 1206 and types of outputs for the model at 1208. The types of training data may include the types of multimodal inputs such as videos, images, text, and/or audio data, among other options. The types of outputs for the models may include outputs of embeddings, objects, classes, text outputs, or other such outputs. The types of training data may be based on the data input to search for the model or may be based on user preferences. The parameters selected in the user interface 1200 may include other parameters for the machine learning model and may be used to determine a type of machine learning model. For example, based on the types of training data, types of outputs, and other parameters, the system may identify one or more model types suited for receiving the training data and providing the desired outputs as well as fulfilling other requested parameters.

The user interface 1200 includes an option to review clusters from a video database. The clusters may represent initially selected training data from a database based on inputs provided by the user, such as the project name and description that may be used as keyword or text inputs, as well as the video data, image data, or other data provided by the user.

Figure 13:
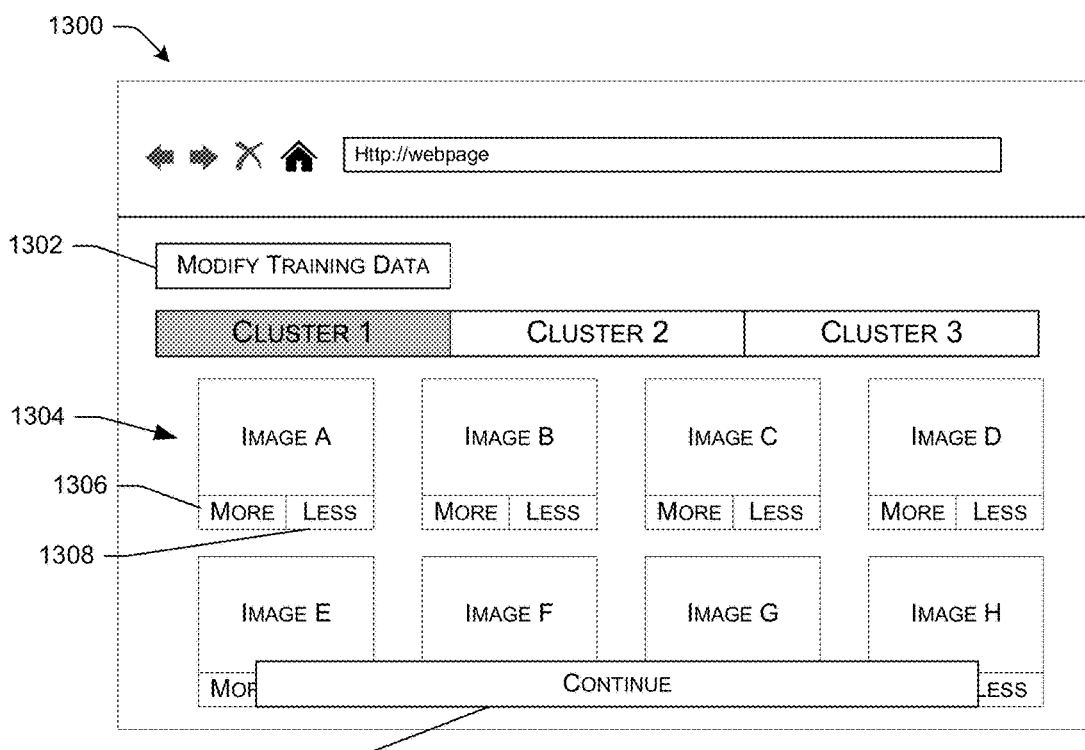
FIG. 13 illustrates an example user interface illustrating a technique for machine learning model generation for video content classification, according to at least some examples.

FIG. 13 illustrates an example user interface 1300 illustrating a technique for machine learning model generation for video content classification, according to at least some examples. The user interface 1300 may enable review of the clusters of data for rapid identification of positive instances and/or negative instances within the clusters of data. For example, the clusters may include selected images 1304 that the user may view and decide whether they accurately reflect the selected attribute. The user may select "more" to indicate a positive instance and may select "less" to indicate a negative instance within the cluster. The user may view other clusters and provide input to the clusters. The user may then modify the training data by selecting 1302 to modify the training data based on the inputs from the user. In response to the modification, new clusters may be presented at the user interface 1300 for the user to either approve and proceed by selecting item 1308 or continue to refine with positive and negative instances.

Figure 14:
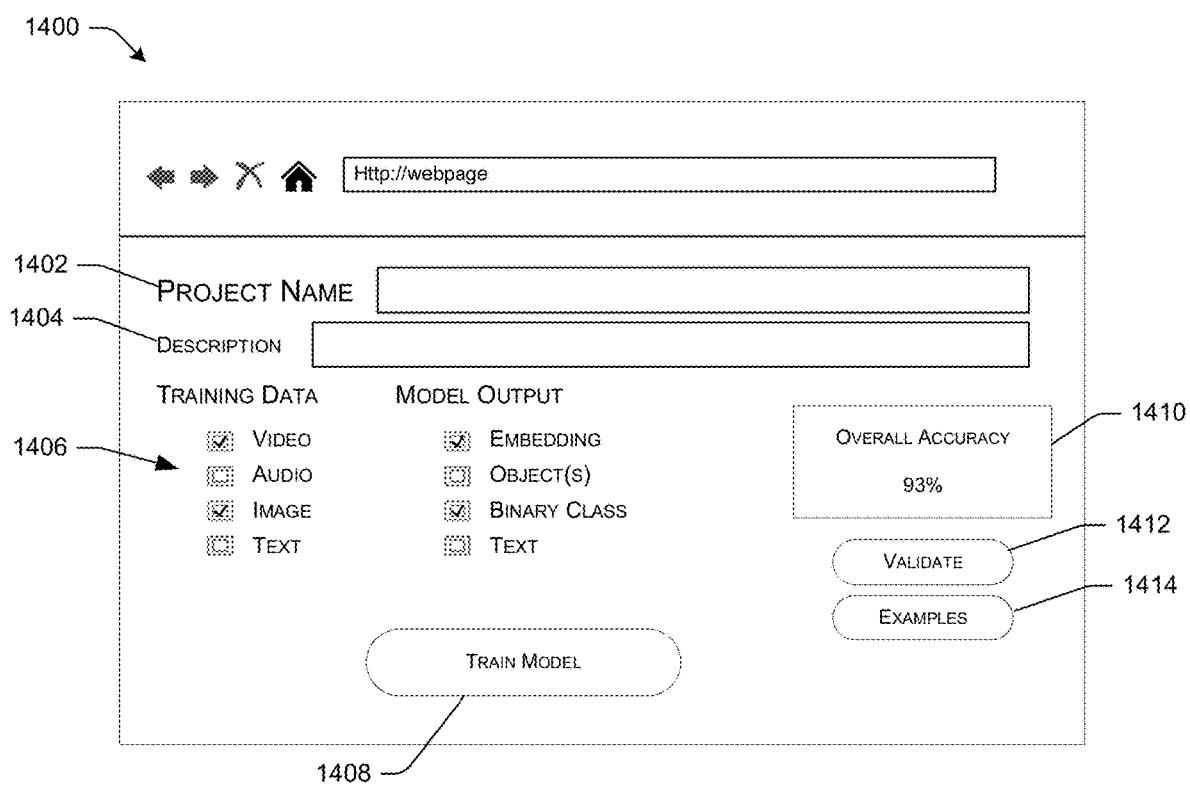
FIG. 14 illustrates an example user interface illustrating a technique for machine learning model generation for video content classification, according to at least some examples.

FIG. 14 illustrates an example user interface 1400 illustrating a technique for machine learning model generation for video content classification, according to at least some examples. The user interface 1400 includes final information for the machine learning model as selected by the user through the user interfaces 1100, 1200, and 1300 and presents a summary of the information associated with the machine learning model. For example, the name 1402, description 1404, types of training data 1406 and model parameters, model predicted accuracy 1410, as well as options to validate training data 1412 or view examples of the results in the training data 1414. The predicted accuracy may be based on the user validation of the clusters, including the positive and negative instances identified by the user. The user may modify one or more of the parameters to return to a previous user interface, for example to continue to validate the clusters of data. When the user is satisfied, they may select item 1408 to instruct the system to train the model. The user may be notified when the model is trained and may then use the model on one or more video catalogs to identify content attributes.

The process illustrated through the user interfaces may be carried out by a user with limited machine learning experience and therefore may be used to build machine learning models at an expedited rate compared with typical approaches. Additionally, the ability of the user to validate samples of training clusters enables the user to refine the model as desired.

Figure 15:
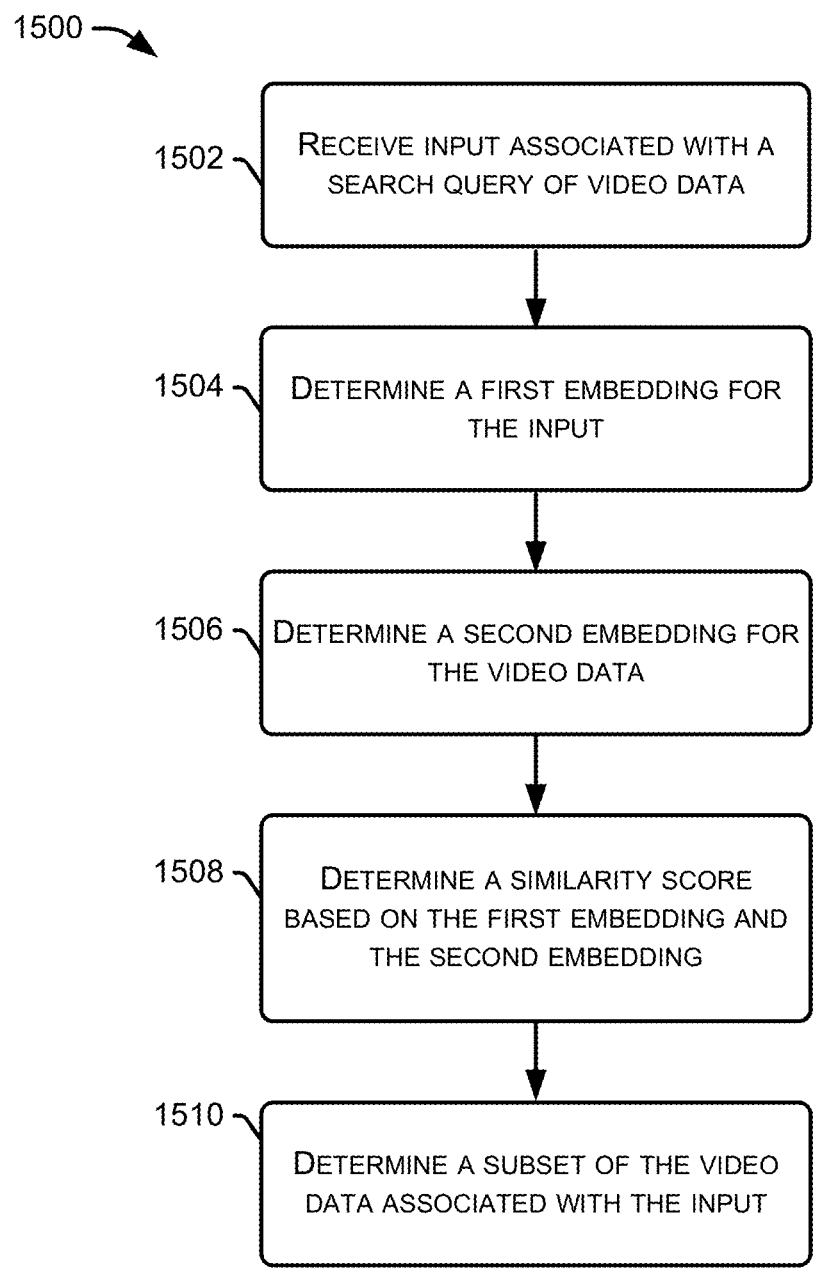
FIG. 15 illustrates an example process for video content retrieval from a database storing video data, according to at least some examples.
Figure 16:
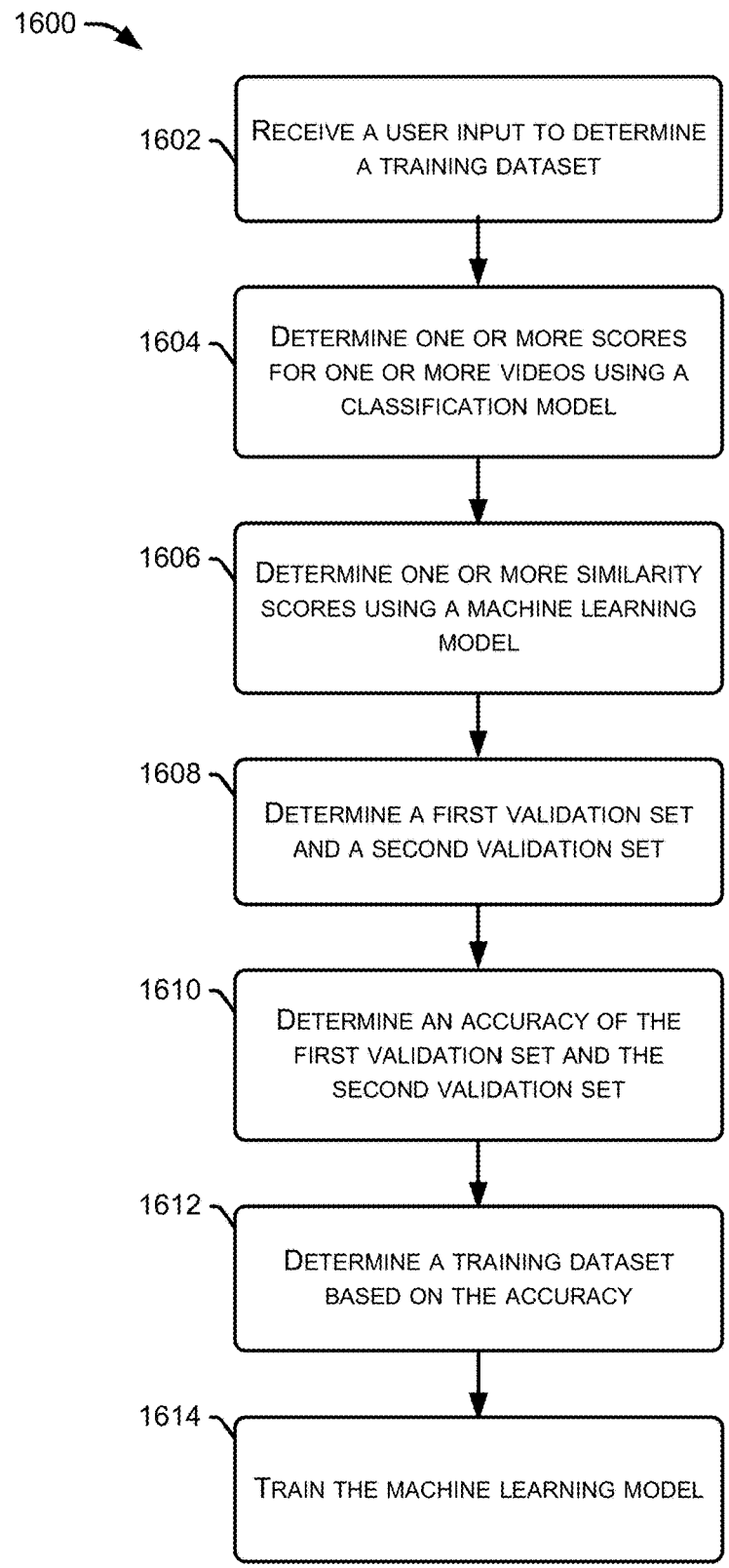
FIG. 16 illustrates a process for filtering video content from a database storing video data, according to at least some examples.
Figure 17:
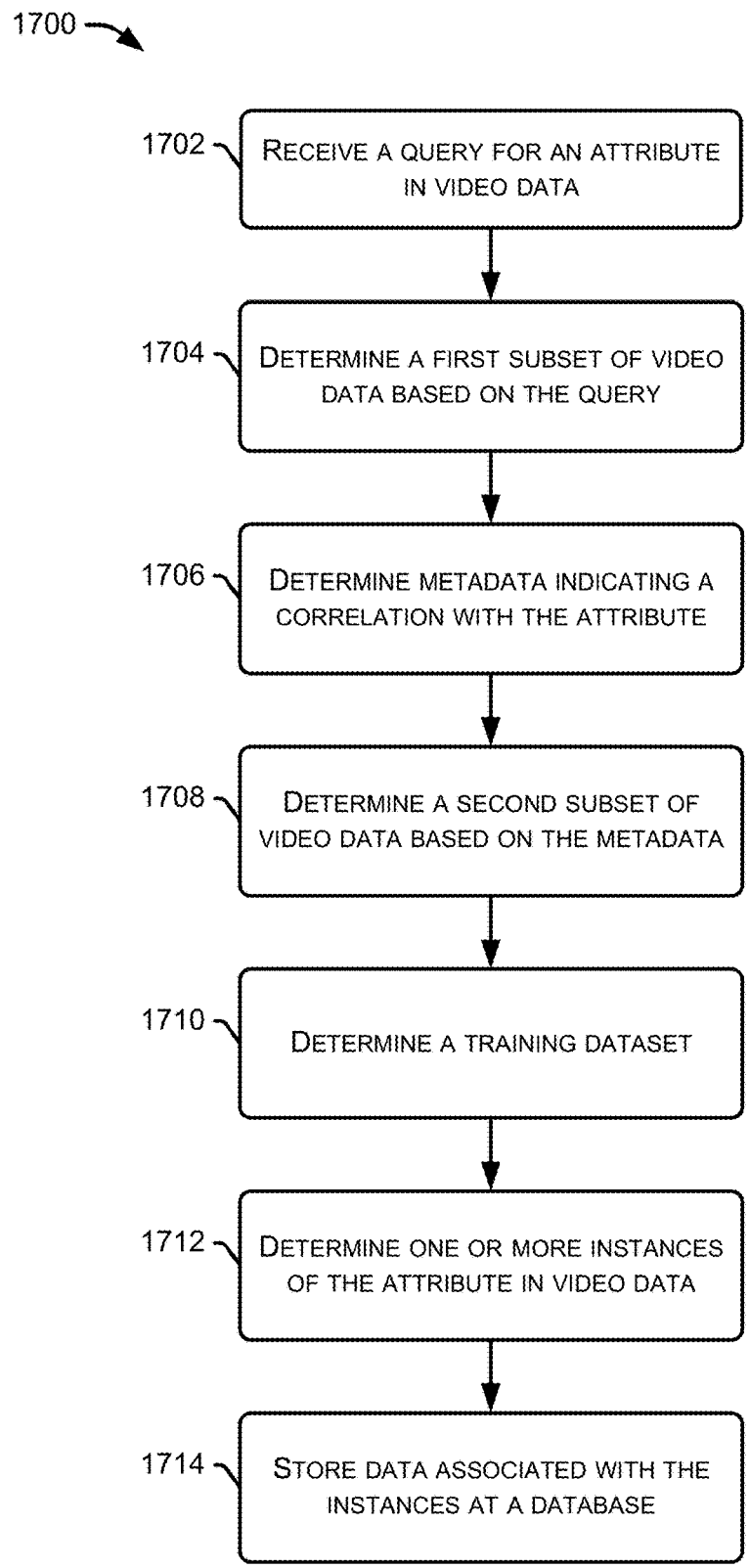
FIG. 17 illustrates a process for training a machine learning model to identify attributes of video content, according to at least some examples.

FIGS. 15, 16, and 17 illustrate flow diagrams of methods according to the present technology. For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Any of a variety of other process implementations which would occur to one of ordinary skill in the art, including but not limited to variations or modifications to the process implementations described herein, are also considered to be within the scope of this disclosure.

FIG. 15 illustrates an example process 1500 for video content retrieval from a database storing video data, according to at least some examples. The process 1500 may be performed by one or more components and/or computing devices, such as the retrieval module 122 of FIG. 1. The process 1500 may begin at 1502 by receiving, from a user computing device of a user, an input describing a search query by a user for video content from a database of video data. The input may include a text input, image input, audio input, video input, or any combination of inputs.

At 1504, the process 1500 may include a computing device determining a text embedding using a first encoder. In some examples, the first encoder may include bidirectional encoder representations from transformers (BERT) that maps a text input to a representation space. In some examples, the first encoder may map other modalities of inputs to the representation space.

In some examples, the input may include a video or image input. The video input or image input may be processed to determine a video or image embedding that maps the video or image input to the representation space. In some examples, for a video input, the video embedding for the input query may be determined by determining query frames for the video input as described herein, determining query embeddings for the query frames using the second encoder, and aggregating the query frame embeddings by mean pooling, or other such aggregation techniques, the query frame embeddings into the query video embedding.

In some examples, the input may include an audio input, such as an audio input associated with a narrative or voiceover of the video data. In some examples, the process 1500 may include determining an audio embedding for the audio input that maps the audio data to the representation space.

At 1506, the process 1500 may include determining a video embedding that maps video data to the representation space. The video data may include video data from one or more video catalogs accessible by the user. The video embedding may be determined using a video encoder in some examples or may include encoding images of representative frames from the video data. For example, the process 1500 may include by determining frames for the video data at a rate of one frame per second or some other rate, such as based on scene shifts, time intervals of up to five seconds or more, or other such manners of dividing the video data. In some examples, the frames may be representative frames for the video data selected based on being a middle frame of a segment of video data. The process 1500 may further determine frame embeddings for the frames using a second encoder that may be different than the first encoder and that maps the frames to the representation space. The frame embeddings may then be aggregated together for form the video embedding. The aggregation may be performed based on mean pooling or other embedding aggregation techniques.

At 1508, the process 1500 includes determining a similarity score for the input and the video data by inputting the first embedding and the second embedding into a transformer-based header configured to determine a distance between the first embedding and the second embedding in the representation space.

In some examples, the similarity score may include multiple similarity scores for multiple different inputs, such as multiple text, audio, image, and/or video inputs. For instance, a second similarity score may be produced for a video input in addition to a first similarity score for a text input. The second similarity score may be produced by inputting the query video embedding and the video embedding into the transformer-based header configured to determine a second distance between the query video embedding and the video embedding in the representation space. The similarity score may be based on an aggregation of the first similarity score and the second similarity score.

At 1510, the process 1500 may include determining, based on the similarity score, a subset of the video data that corresponds with the search query provided as the input. The subset may be selected based on the video data within the subset having a similarity score that exceeds a predetermined threshold.

FIG. 16 illustrates a process 1600 for filtering video content from a database storing video data, according to at least some examples. The process 1600 may be performed by one or more components and/or computing devices as described herein, including for example, the filtering module 120 of FIG. 1. The process 1600 may be performed to determine a training dataset for a machine learning model or otherwise determine a set of data from a video catalog.

The process 1600 may begin at 1602 by receiving a user input associated with a label to filter one or more videos from a database storing a plurality of videos. The user input may include multiple modalities, such as text, audio, image, and/or video data. The user input may include a description of an attribute and/or an example of the attribute.

At 1604, the process 1600 may include determining a plurality of scores for one or more videos using a classification model. The classification model may include an classification model that maps images within the plurality of videos to the label. The process 1600 may further include determining a first ranking of the plurality of videos based on the plurality of scores, for example to rank the plurality of videos based on a descending order of scores. Additionally, a first subset of the plurality of videos may be selected based on the first ranking, for example by selecting the top "x" results or any number of results over a particular score threshold.

At 1606, the process 1600 may include determining one or more similarity scores between the user input and the video data using a machine learning model. In some examples, determining the similarity scores may include determining a first embedding for a content-based image retrieval model based on query images and query text related to the label using an encoder. The media retrieval model may include an encoder and a similarity calculator. Further, the process 1600 may include determining a second embedding for the media retrieval model using the encoder based on representative frames of the plurality of videos. The representative frames may be selected from the videos as described herein. The similarity scores may then be determined between the label and the plurality of videos by calculating an inner product of the first embedding and the second embedding. After determining the similarity scores, the videos may be ranked in a second ranking of the plurality of videos based on the similarity scores, for example in descending order. Additionally, a second subset of the plurality of videos may be selected based on the second ranking, for example by selecting the top "x" results or any number of results over a particular score threshold.

In some examples, the process 1600 may include training the media retrieval model using a plurality of video datasets and a plurality of labels associated with the video datasets. The process 1600 may also include receiving a user input to filter one or more videos from a video database based on a second label. The process 1600 may then use the machine learning model trained at 1614 to determine one or more videos by inputting the user input to the model.

At 1608, the process 1600 may include determining a first validation set and a second validation set from the first subset and the second subset. The first validation set may be determined by selecting from the first subset of the plurality of videos based on the first ranking. The second validation set may be determined by selecting from the second subset of the plurality of videos based on the second ranking. The first validation set and the second validation set may include a random selection of results from the first subset and the second subset, for example with as few as ten from each subset.

At 1610, the process 1600 includes determining an accuracy of the first validation set and the second validation set. The accuracy may be determined based on receiving validation results for the first validation set and the second validation set describing an accuracy of the first validation set and the second validation set with the label. The validation results may be received as a result of a manual validation of the first validation set and the second validation set. In some examples, the validation results may come from other machine learning models or sources.

At 1612, the process 1600 includes determining a video dataset associated with the label from the first subset or the second subset based on the validation results. The video dataset may include a training dataset for training a machine learning model to identify the input. The training dataset may be selected based on the accuracy of the first validation set or the second validation set, for example by selecting the set having the higher accuracy score.

At 1614, the process 1600 includes training a machine learning model using the training dataset determined at 1612. The machine learning model may be used to identify attributes and classify video data from a video catalog based on the attributes included in the input.

FIG. 17 illustrates a process 1700 for training a machine learning model to identify attributes of video content, according to at least some examples. The process 1700 may be performed by one or more components and/or computing devices as described herein, including for example, the attribute module 124 of FIG. 1. The process 1700 may be performed to classify attributes to one or more videos in a video catalog.

At 1702, the process 1700 includes receiving, from a user computing device of a user, user input data associated with generation of a type of machine learning model. The user input may include a query for a label associated with an attribute contained within video data.

At 1704, the process 1700 includes determining a first subset of vide data based on the query. The first subset may be determined by first determining embedding values for a machine learning model of the type of machine learning model based on the user input data. The first subset may then be determined from a database of video data based on the user input data and the embedding values.

In some examples, the process 1700 may include searching a second database of existing machine learning models for the type of machine learning model. The embedding values may then be generated based on generating the embedding values in response to the database of existing machine learning models not including the type of machine learning model. In some examples the embedding values may be selected from an existing machine learning model in response to the database including the type of machine learning model.

At 1706, the process 1700 includes determining metadata indicating a correlation with the attribute. The metadata may be associated with the first subset of video data. In some examples, the metadata may include indications of matching for the first subset of data, the indications of matching associated with whether an instance of the first subset of data is associated with the user input data. The indications may be received from a manual validation process or other process, such as a second machine learning model that acts as a supervisory or teaching model. For example, a user may provide the metadata as indications of positive or negative instances via a user interface as described with respect to FIGS. 10-14.

At 1708, the process 1700 includes determining a second subset of video data based at least in part on the metadata. The second subset may include a training dataset based on the indications of matching. The second subset may include some or all of the first subset and may include additional video data or fewer video data files based on the metadata indications.

At 1710, the process 1700 includes determining a training dataset from the second subset. In some examples, the training dataset may be determined by iteratively receiving metadata indicating a correlation with the attribute for some or all of the subset of video data and subsequently determining an additional subsequent subset of video data. The process may be iteratively repeated until the training dataset is determined with accuracy as determined by a user.

In some examples, determining the training dataset may include training the machine learning model using the training dataset. The trained machine learning model may then be used to determine labels for a second subset of data. A precision of the trained machine learning model may be determined based on the metadata including label verification data for validation.

At 1712, the process 1700 includes determining one or more instances of the attribute in video data. Determining the instances may include training a machine learning model in response to the precision being below a threshold and alerting the user that the machine learning model is trained in response to the precision being at or above the threshold. The trained machine learning model may be used to determine one or more instances of the attribute in video data through inference by inputting the video data to the trained model.

In some examples, the machine learning model may include a convolutional neural network and a linear classifier, with the linear classifier configured to receive an output of the convolutional neural network. In some examples, the embedding values may include the embedding values of the convolutional neural network. Training the machine learning model may include using a pretrained convolutional neural network or other pretrained model and training the linear classifier using the training dataset.

At 1714, the process 1700 includes storing data associated with the instances at a database. The instances may be stored as part of a repository of classifications and/or attributes of video data stored or otherwise associated with the database. The instances, classifications, and or attributes may be used to provide contextual understanding of the video data.

In some examples, the process 1700 may be repeated for a second query including a second label associated with a second attribute to identify the second attribute within the video data and build the repository of video attributes. The repository may serve as a content summary for the video data that may be used downstream based on the content of the video data.

Figure 18:
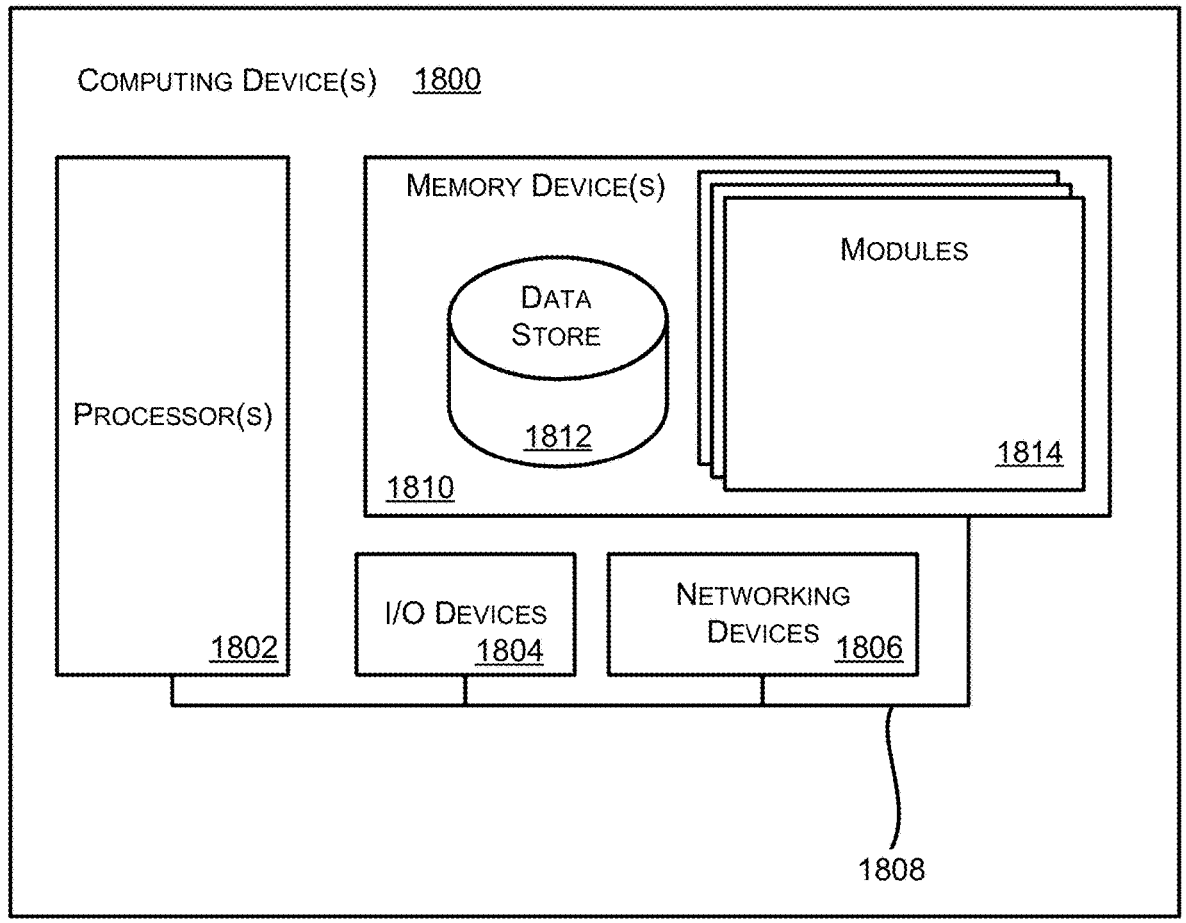
FIG. 18 illustrates a block diagram of a computing system for use in video content retrieval, filtering, and classification, according to at least some examples.

FIG. 18 illustrates a block diagram of a computing device 1800 for use in for use in video content retrieval, filtering, and classification, according to the present description. The computing device 1800 may include one or more computing devices on which services or modules of this technology may execute. The computing device 1800 is illustrated on which a high-level example of the technology may be executed. The computing device 1800 may be an example of the content server 114 and/or user device 104. The computing device 1800 may include one or more processors 1802 that are in communication with memory devices 1810. The computing device 1800 may include a local communication interface 1808 for the components in the computing device. For example, the local communication interface 1808 may be a local data bus and/or any related address or control busses as may be desired.

The memory device 1810 may contain modules 1814 that are executable by the processor(s) and data for the modules 1814. The modules 1814 may include the modules shown and described with respect to FIG. 1, among others. A data store 1812 may also be located in the memory device 1810 for storing data related to the modules and other applications along with an operating system that is executable by the processor 1802.

The computing device 1800 may further include or be in communication with a client device, which may include a display device. The client device may be available for an administrator to use in interfacing with the computing device 1800, such as to review operation of a virtual computing instance, make improvements to machine learning models and so forth.

Various applications may be stored in the memory device 1810 and may be executable by the processor 1802. Components or modules discussed in this description that may be implemented in the form of software using high programming level languages that are compiled, interpreted or executed using a hybrid of the methods.

The computing device 1800 may also have access to I/O (input/output) devices 1804 that are usable by the computing devices. An example of an I/O device 1804 is a display screen that is available to display output from the computing devices. Other known I/O device may be used with the computing device as desired. Networking devices 1806 and similar communication devices may be included in the computing device 1800. The networking devices 1806 may be wired or wireless networking devices 1806 that connect to the internet, a LAN, WAN, or other computing network.

The components or modules that are shown as being stored in the memory device 1810 may be executed by the processor 1802. The term "executable" may mean a program file that is in a form that may be executed by a processor 1802. For example, a program in a higher level language may be compiled into machine code in a format that may be loaded into a random access portion of the memory device 1810 and executed by the processor 1802, or source code may be loaded by another executable program and interpreted to generate instructions in a random access portion of the memory to be executed by a processor 1802. The executable program may be stored in any portion or component of the memory device 1810. For example, the memory device 1810 may be random access memory (RAM), read only memory (ROM), flash memory, a solid state drive, memory card, a hard drive, optical disk, floppy disk, magnetic tape, or any other memory components.

The processor 1802 may represent multiple processors and the memory device 1810 may represent multiple memory units that operate in parallel to the processing circuits. This may provide parallel processing channels for the processes and data in the system. The local interface may be used as a network to facilitate communication between any of the multiple processors and multiple memories. The local interface may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology. The computer readable storage medium may, for example, be in the form of a non-transitory computer readable storage medium. As used herein, the terms "medium" and "media" may be interchangeable with no intended distinction of singular or plural application unless otherwise explicitly stated. Thus, the terms "medium" and "media" may each connote singular and plural application.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

It is noted that any of the distributed system implementations described above, or any of their components, may be implemented as one or more web services. In some implementations, a web service may be implemented by a software and/or hardware system designed to support interoperable machine-to-machine interaction over a network. A web service may have an interface described in a machine-processable format, such as the Web Services Description Language (WSDL). Other systems may interact with the web service in a manner prescribed by the description of the web service's interface. For example, the web service may define various operations that other systems may invoke, and may define a particular application programming interface (API) to which other systems may be expected to conform when requesting the various operations.

In various implementations, a web service may be requested or invoked through the use of a message that includes parameters and/or data associated with the web services request. Such a message may be formatted according to a particular markup language such as Extensible Markup Language (XML), and/or may be encapsulated using a protocol such as Simple Object Access Protocol (SOAP). To perform a web services request, a web services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some implementations, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features, it is to be understood that the subject matter defined in the appended claims is not necessarily limited to the specific features described. Rather, the specific features are disclosed as illustrative forms of implementing the claims.

The invention claimed is:

1. A method for determining a training dataset for a machine learning model comprising:
    receiving a user input associated with a label to filter one or more videos from a database storing a plurality of videos;
    segmenting, using a boundary detection algorithm, the plurality of videos into a plurality of segments representing a plurality of video clips of the plurality of videos;
    determining one or more representative frames from the plurality of segments, the one or more representative frames comprising one or more images useable in place of the plurality of segments;
    determining, using an image classification model configured to detect pre-defined categories of objects within the one or more representative frames, one or more image classification labels for the one or more representative frames that are associated with particular content of interest as identified by the label;
    determining, using the image classification model and based on the one or more image classification labels, a plurality of image classification scores associated with probabilities that the one or more representative frames are associated with the label;
    determining a first ranking of the one or more representative frames based on the plurality of image classification scores;
    selecting a first subset of the plurality of videos based on the first ranking;
    determining, using a media retrieval model comprising a media retrieval encoder and a similarity calculator, a first embedding based on query images and query text related to the label;
    determining, using the media retrieval model, a second embedding based on the one or more representative frames of the plurality of videos;
    determining similarity embedding scores between the label and the plurality of videos by calculating an inner product of the first embedding and the second embedding;
    determining a second ranking of the plurality of videos based on the similarity embedding scores;
    selecting a second subset of the plurality of videos based on the second ranking;
    selecting a first validation set of videos by selecting from the first subset of the plurality of videos based on the first ranking;
    selecting a second validation set of videos by selecting from the second subset of the plurality of videos based on the second ranking;
    receiving validation results for the first validation set and the second validation set describing an accuracy of the first validation set and the second validation set with the label; and
    determining a video dataset associated with the label from the first subset or the second subset based on the validation results.

2. The method of claim 1, further comprising:
    training, iteratively, the media retriever model using a plurality of video datasets and a plurality of labels;
    receiving a second user input to filter the one or more videos from the database based on a second label; and
    determining the one or more videos by inputting the second user input to the media retriever model.

3. The method of claim 1, wherein, in response to the label being outside of the pre-defined categories of objects, determining the video dataset based on only the second subset of the plurality of videos.

4. The method of claim 1, wherein:
    determining the second embedding comprises:
        determining a query word and a query image based on the user input; and
        using the media retrieval encoder to generate the second embedding based on the query word and the query image; and
    determining the similarity embedding scores comprises calculating a cosine similarity between the first embedding and the second embedding.

5. A method comprising:
    receiving a user input including a request to determine one or more videos from a database storing a plurality of videos;
    segmenting, using a boundary detection algorithm, the plurality of videos into a plurality of segments representing a plurality of video clips of the plurality of videos;
    determining one or more representative frames from the plurality of segments, the one or more representative frames comprising one or more images useable in place of the plurality of segments;
    determining, using an image classification model configured to detect pre-defined categories of objects within the one or more representative frames, one or more image classification labels for the one or more representative frames that are associated with particular content of interest as identified by the user input;
    determining, using the image classification model and based at least in part on the one or more image classification labels, one or more image classification scores associated with a probability that the one or more representative frames are associated with the user input;
    determining one or more subsets of the plurality of videos;
    determining, using a machine learning model configured to generate embeddings, a first embedding based at least in part on one or more query images and one or more query text related to the user input using an encoder of the machine learning model;
    determining a second embedding for the one or more subsets using the encoder;
    determining, based at least in part on the first embedding and the second embedding, one or more similarity embedding scores between the first embedding for the user input and the second embedding for the one or more subsets using the machine learning model;
    determining a first validation set based at least in part on the one or more image classification scores;
    determining a second validation set based at least in part on the one or more similarity embedding scores;
    determining an accuracy of the first validation set and the second validation set; and
    determining a video dataset associated with the user input from the first validation set or the second validation set based at least in part on the accuracy.

6. The method of claim 5, wherein, in response to the user input being outside of the pre-defined categories of objects, determining the video dataset based on only the second validation set.

7. The method of claim 6, wherein determining the one or more similarity embedding scores comprises determining a cosine similarity between the first embedding and the second embedding.

8. The method of claim 6, wherein the one or more representative frames are determined by:
selecting a middle frame of the plurality of segments as the one or more representative frames.

9. The method of claim 6, wherein:
the user input comprises text data and image data, and determining the second embedding comprises:
determining a third embedding for the text data;
determining a fourth embedding for the image data; and
determining the second embedding based at least in part on a logistic regression of the third embedding and the fourth embedding.

10. The method of claim 5, wherein the video dataset comprises a training dataset for a second machine learning model to classify video data to detect content of the video data.

11. The method of claim 10, wherein the second machine learning model is configured to identify video content duplication by receiving, as an input to the second machine learning model, first video content and outputting one or more identifiers of second video content based at least in part on a similarity score associated with the second video content exceeding a predetermined threshold.

12. The method of claim 5, further comprising:
determining feedback for the image classification model or the machine learning model based at least in part on the accuracy; and
refining the image classification model or the machine learning model based at least in part on the feedback.

13. The method of claim 5, further comprising:
wherein determining the one or more image classification scores comprises determining the probability based at least in part on a second probability that the user input is associated with the one or more image classification labels.

14. A non-transitory computer-readable medium having instructions stored thereon that, when executed by one or more processors, cause the one or more processors to perform operations comprising:
receiving a user input to determine one or more videos from a database storing a plurality of videos;
segmenting, using a boundary detection algorithm, the plurality of videos into a plurality of segments representing a plurality of video clips of the plurality of videos;
determining one or more representative frames from the plurality of segments, the one or more representative frames comprising one or more images useable in place of the plurality of segments;
determining, using an image classification model configured to detect pre-defined categories of objects within the one or more representative frames, one or more image classification labels for the one or more representative frames that are associated with particular content of interest as identified by the user input;
determining, using the image classification model and based at least in part on the one or more image classification labels, one or more image classification scores associated with a probability that the one or more representative frames are associated with the user input;
determining one or more subsets of the plurality of videos;
determining, using a machine learning model configured to generate embeddings, a first embedding based at least in part on one or more query images and one or more query text related to the user input using an encoder of the machine learning model;
determining a second embedding for the one or more subsets using the encoder;
determining, based at least in part on the first embedding and the second embedding, one or more similarity embedding scores between the first embedding for the user input and the second embedding for the one or more subsets using the machine learning model;
selecting a first validation set based at least in part on the one or more image classification scores;
selecting a second validation set based at least in part on the one or more similarity embedding scores;
determining an accuracy of the first validation set and the second validation set; and
determining a video dataset associated with the user input from the first validation set or the second validation set based at least in part on the accuracy.

15. The non-transitory computer-readable medium of claim 14, wherein the video dataset comprises a training dataset for a second machine learning model to classify video data to detect content of the video data.

16. The non-transitory computer-readable medium of claim 15, wherein the second machine learning model is configured to identify video content duplication by receiving, as an input to the second machine learning model, first video content and outputting one or more identifiers of second video content based at least in part on a similarity score associated with the second video content exceeding a predetermined threshold.

17. The non-transitory computer-readable medium of claim 14, wherein determining the one or more similarity embedding scores comprises determining a cosine similarity between the first embedding and the second embedding.

18. The non-transitory computer-readable medium of claim 14, wherein the one or more representative frames are determined by:
selecting a middle frame of the plurality of segments as the one or more representative frames.

19. The non-transitory computer-readable medium of claim 14, wherein the operations further comprise:
determining feedback for the image classification model or the machine learning model based at least in part on the accuracy; and
refining the image classification model or the machine learning model based at least in part on the feedback.

20. The non-transitory computer-readable medium of claim 14, wherein, in response to the user input being outside of the pre-defined categories of objects, determining the video dataset based on only the second validation set.

* * * * *